(12) United States Patent
Kamon

(10) Patent No.: US 12,718,362 B2
(45) Date of Patent: Aug. 25, 2026

(54) MEDICAL IMAGE PROCESSING APPARATUS, ENDOSCOPE SYSTEM, MEDICAL IMAGE PROCESSING METHOD, AND MEDICAL IMAGE PROCESSING PROGRAM

(71) Applicant: FUJIFILM Corporation, Tokyo (JP)

(72) Inventor: Shumpei Kamon, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 250 days.

(21) Appl. No.: 18/458,121

(22) Filed: Aug. 29, 2023

(65) Prior Publication Data

US 2023/0410303 A1 Dec. 21, 2023

Related U.S. Application Data

(63) Continuation of application No. PCT/JP2022/008166, filed on Feb. 28, 2022.

(30) Foreign Application Priority Data

Mar. 1, 2021 (JP) ................................ 2021-031698

(51) Int. Cl.
*G06K 9/00* (2022.01)
*G02B 21/34* (2006.01)
(Continued)

(52) U.S. Cl.
CPC ............ *G06T 7/0012* (2013.01); *G06V 10/25* (2022.01); *G06V 10/44* (2022.01); *G06V 10/761* (2022.01);
(Continued)

(58) Field of Classification Search
CPC ....... G06K 9/00; A61B 1/00045; G02B 21/34
(Continued)

(56) References Cited

U.S. PATENT DOCUMENTS 10,893,792 B2 * 1/2021 Iwaki ................. G02B 23/2461
11,464,394 B2 10/2022 Endo
(Continued)

FOREIGN PATENT DOCUMENTS

CN 112055555 12/2020
JP 2020069300 5/2020
(Continued)

OTHER PUBLICATIONS

"Search Report of Europe Counterpart Application", issued on Jul. 10, 2024, p. 1-p. 8.
(Continued)

*Primary Examiner* — Seyed H Azarian
(74) *Attorney, Agent, or Firm* — JCIPRNET

(57) ABSTRACT

A medical image processing apparatus according to one aspect of the present invention is a medical image processing apparatus including a processor. The processor is configured to execute an image acquisition process of acquiring a time-series medical image; a region-of-interest detection process of detecting a region of interest from the acquired medical image; a display control process of causing a display apparatus to display the medical image; a first reporting process of, in response to the region of interest being detected in the region-of-interest detection process, causing the display apparatus to perform superimposed display of the medical image and information about the detected region of interest; and a second reporting process of, in response to the region of interest being detected in the region-of-interest detection process, outputting a sound from a sound output apparatus. The processor is configured to execute the second reporting process after the first reporting process.

14 Claims, 16 Drawing Sheets

(51) Int. Cl.

| | |
|---|---|
| ***G06T 7/00*** | (2017.01) |
| ***G06V 10/25*** | (2022.01) |
| ***G06V 10/44*** | (2022.01) |
| ***G06V 10/74*** | (2022.01) |
| ***G09G 5/377*** | (2006.01) |

(52) U.S. Cl.
CPC .... *G09G 5/377* (2013.01); *G06T 2207/10068* (2013.01)

(58) Field of Classification Search
USPC ....... 382/100, 103, 128–132, 154, 156, 168, 382/173, 181, 189, 199, 224, 254, 276, 382/305, 312; 359/383; 378/4, 21, 28
See application file for complete search history.

(56) References Cited

U.S. PATENT DOCUMENTS

| | | | | |
|---|---|---|---|---|
| 2009/0086314 | A1* | 4/2009 | Namba | G01N 21/6452 359/383 |
| 2018/0249900 | A1 | 9/2018 | Imaizumi et al. | |
| 2019/0239718 | A1* | 8/2019 | Iwaki | G06T 7/0012 |
| 2020/0069160 | A1* | 3/2020 | Oosake | A61B 1/000094 |
| 2020/0237184 | A1* | 7/2020 | Shigeta | A61B 1/00055 |
| 2021/0042553 | A1 | 2/2021 | Oosake | |
| 2021/0153720 | A1 | 5/2021 | Usuda | |
| 2021/0158528 | A1 | 5/2021 | Endo | |
| 2021/0201486 | A1 | 7/2021 | Takenouchi | |
| 2021/0274999 | A1* | 9/2021 | Kubota | A61B 1/00055 |
| 2022/0151462 | A1 | 5/2022 | Usuda | |
| 2023/0016855 | A1 | 1/2023 | Endo | |
| 2023/0199152 | A1 | 6/2023 | Oosake | |
| 2024/0259534 | A1 | 8/2024 | Oosake | |

FOREIGN PATENT DOCUMENTS

| | | |
|---|---|---|
| WO | 2017081976 | 5/2017 |
| WO | 2020036109 | 2/2020 |
| WO | 2020040086 | 2/2020 |
| WO | 2020067105 | 4/2020 |
| WO | 2020170809 | 8/2020 |
| WO | 2021029292 | 2/2021 |

OTHER PUBLICATIONS

“Office Action of China Counterpart Application”, issued on Jan. 24, 2026, with English translation thereof, pp. 1-30.

“International Search Report (Form PCT/ISA/210) of PCT/JP2022/008166”, mailed on May 17, 2022, with English translation thereof, pp. 1-5.

“Written Opinion of the International Searching Authority (Form PCT/ISA/237) of PCT/JP2022/008166”, mailed on May 17, 2022, with English translation thereof, pp. 1-10.

* cited by examiner 223
252
250
INPUT LAYER
256
CONVOLUTIONAL LAYER
258
POOLING LAYER
CONVOLUTIONAL LAYER
CONVOLUTIONAL LAYER
POOLING LAYER
CONVOLUTIONAL LAYER
254
OUTPUT LAYER 223
252
250
INPUT LAYER
256
CONVOLUTIONAL LAYER
258
POOLING LAYER
CONVOLUTIONAL LAYER
CONVOLUTIONAL LAYER
POOLING LAYER
CONVOLUTIONAL LAYER
260
FULLY CONNECTED LAYER
254
OUTPUT LAYER

504 time t0 t1 t2 t3 t4

500
522
508
504
time
t0
t1
t2
t3
t4

FIG. 13

500
520
511
504
508
504
508
504
508
504
time
t0
t1
t2
t3
t4

MEDICAL IMAGE PROCESSING APPARATUS, ENDOSCOPE SYSTEM, MEDICAL IMAGE PROCESSING METHOD, AND MEDICAL IMAGE PROCESSING PROGRAM

CROSS-REFERENCE TO RELATED APPLICATIONS

The present application is a Continuation of PCT International Application No. PCT/JP2022/008166 filed on Feb. 28, 2022 claiming priority under 35 U.S.C § 119(a) to Japanese Patent Application No. 2021-031698 filed on Mar. 1, 2021. Each of the above applications is hereby expressly incorporated by reference, in its entirety, into the present application.

BACKGROUND OF THE INVENTION

1. Field of the Invention

The present invention relates to a medical image processing apparatus, an endoscope system, a medical image processing method, and a medical image processing program, and particularly relates to a technique of reporting a detection result of a region of interest.

2. Description of the Related Art

Reporting of a detection result of a region of interest obtained by a medical image processing apparatus has been known as a method for assisting a user, such as a medical doctor, in observing a medical image or making a diagnosis. For example, WO2017/081976A describes that a region of interest is detected by a region-of-interest detecting unit selected from among a plurality of region-of-interest detecting units, and the result is reported (displayed). JP2020-69300A describes that a detection result or a discrimination result is reported using a sound.

SUMMARY OF THE INVENTION

In the case of detecting a region of interest such as a lesion from a medical image such as an endoscopic image or an ultrasound image by artificial intelligence (AI) or the like and notifying a user, it is desired to immediately report a detection target in order to prevent oversight of the lesion. However, a false positive may occur in automatic detection by AI. Such a case involves a problem that an erroneous report is made and the user feels annoyed. In particular, if a report by sound is frequently and erroneously output, the user tends to feel more annoyed than in a case where a report is displayed. However, in the related art such as the above-described WO2017/081976A and JP2020-69300A, it is difficult to suppress unnecessary sound output while reducing the possibility of oversight of a region of interest.

The present invention has been made in view of these circumstances, and an object of the present invention is to provide a medical image processing apparatus, an endoscope system, a medical image processing method, and a medical image processing program that are capable of suppressing unnecessary sound output while reducing the possibility of oversight of a region of interest.

To achieve the above-described object, a medical image processing apparatus according to a first aspect of the present invention is a medical image processing apparatus including a processor. The processor is configured to execute an image acquisition process of acquiring a time-series medical image; a region-of-interest detection process of detecting a region of interest from the acquired medical image; a display control process of causing a display apparatus to display the medical image; a first reporting process of, in response to the region of interest being detected in the region-of-interest detection process, causing the display apparatus to perform superimposed display of the medical image and information about the detected region of interest; and a second reporting process of, in response to the region of interest being detected in the region-of-interest detection process, outputting a sound from a sound output apparatus. The processor is configured to execute the second reporting process after the first reporting process.

In the medical image processing apparatus according to the first aspect, the processor executes the first reporting process (display on the display apparatus) in response to a region of interest being detected. Accordingly, an effect of preventing oversight of the region of interest is obtained. From the viewpoint of preventing oversight, it is preferable that the processor immediately (with as short a delay as possible) execute the first reporting process in response to a region of interest being detected. However, an inevitable delay due to processing in the apparatus and a delay due to intermittent acquisition of a medical image are allowed.

In detection of a region of interest, a false positive occurs instantaneously in many cases and is less likely to occur continuously. Thus, as a result of suppressing sound output when a region of interest is detected instantaneously, it is possible to reduce the degree at which the user feels annoyed due to sound output resulting from a false positive. In the first embodiment, from this point of view, the processor executes the second reporting process of outputting a sound after the first reporting process. That is, the processor does not output a sound in a period immediately after the first reporting process (screen display) even when a region of interest is detected, and thus sound output due to an instantaneous false positive is suppressed in this period.

The processor (a medical image processing apparatus) may set “how much to delay the second reporting (delay time or waiting time)” in accordance with or not in accordance with designation by a user. The user is able to designate a delay time in consideration of a balance between the degree of suppression of sound output due to a false positive and the reporting intensity of a sound.

In the medical image processing apparatus according to the first aspect, such first and second reporting processes make it possible to suppress unnecessary sound output (sound output due to an instantaneous false positive) while reducing the possibility of oversight of a region of interest.

In the first aspect and each of the following aspects, “acquiring a time-series medical image” includes sequential acquisition of a plurality of medical images captured at a determined frame rate. The acquisition may be performed in real time or in non-real time.

The medical image processing apparatus according to the first aspect can be implemented as, for example, a processor portion of a medical image processing system, but is not limited to such an aspect. The “medical image” is an image acquired as a result of imaging, measurement, or the like performed on a living body, such as a human body, for the purpose of diagnosis, treatment, measurement, or the like, and may be, for example, an endoscopic image, an ultrasound image, a computed tomography (CT) image, or a magnetic resonance imaging (MRI) image. In the first aspect and each of the following aspects, a “region of interest (ROI)” may be a lesion region or a candidate lesion region, an organ or a vessel, a treated region, or a region in which a treatment tool or the like is depicted, in a medical image. The "region of interest" may be referred to as a "region of concern".

In a medical image processing apparatus according to a second aspect, in the first aspect, the processor is configured to execute the second reporting process in response to the region of interest being detected after a first period elapses from when the region of interest is detected in the region-of-interest detection process, and is configured not to execute the second reporting process in response to the region of interest not being detected after the first period elapses. If the region of interest is detected after the first period elapses from when the region of interest is detected, it is considered that the detection is continuous and the possibility of an instantaneous false positive is low, and thus the second reporting process (sound output) can be performed. In the second aspect, the processor is capable of setting a value of the "first period" in accordance with a purpose or a target of observation or designation by a user.

In a medical image processing apparatus according to a third aspect, in the first or second aspect, the processor is configured to, in the first reporting process, perform the superimposed display of the information in accordance with a position of the region of interest in the medical image. The third aspect specifically defines a mode of the first reporting process. The processor may display the information in the region of interest in the medical image or may display the information around the region of interest. Alternatively, the processor may display the information outside a medical image display region on the display screen of the display apparatus.

In a medical image processing apparatus according to a fourth aspect, in any one of the first to third aspects, the processor is configured to execute a number-of-detections calculation process of calculating the number of consecutive detections for the region of interest detected in the region-of-interest detection process, and execute the second reporting process in response to the number of consecutive detections exceeding a predetermined number. If the number of consecutive detections exceeds the predetermined number, it is considered that "detection is continuous and a possibility of an instantaneous false positive is low", and thus the second reporting process can be executed as in the fourth aspect. The processor may set the "predetermined number" in accordance with or not in accordance with designation by a user.

In a medical image processing apparatus according to a fifth aspect, in the fourth aspect, the processor is configured to further execute a feature quantity hold process of holding a feature quantity of the detected region of interest; and an identity determination process of comparing a feature quantity of a first region of interest detected from a medical image captured at a first time with the held feature quantity of a second region of interest detected from a second medical image captured at a second time that is a time before the first time, thereby determining identity between the first region of interest and the second region of interest. The processor is configured to, in the number-of-detections calculation process, calculate the number of consecutive detections for the first region of interest in accordance with a determination result obtained in the identity determination process. As in the fifth aspect, as a result of calculating the number of consecutive detections in consideration of the identity between regions of interest, the second reporting process can be performed more appropriately. The "holding" may be transitory recording (storage) or may be non-transitory recording. Regarding the first and second regions of interest, the "feature quantity" is, for example, the type, position, shape, size, or color, but is not limited to these examples.

In a medical image processing apparatus according to a sixth aspect, in the fifth aspect, the processor is configured to, in response to a determination being made in the identity determination process that the first region of interest and the second region of interest are identical to each other, in the number-of-detections calculation process, increase the number of consecutive detections recorded for the second region of interest to calculate the number of consecutive detections of the first region of interest. The sixth aspect defines a specific mode of calculating the number of consecutive detections.

In a medical image processing apparatus according to a seventh aspect, in the fifth or sixth aspect, the processor is configured to, in the identity determination process, determine the identity by comparing, of the feature quantity held in the feature quantity hold process, a feature quantity obtained at a time that is within a determined period before the first time, with the feature quantity of the first region of interest. In the seventh aspect, the "time that is within a determined period before the first time" corresponds to the "second time" in the fifth aspect. This "determined period" may be set in consideration of problems of an increase in calculation cost and a decrease in accuracy of identity determination.

In a medical image processing apparatus according to an eighth aspect, in any one of the first to seventh aspects, the processor is configured to, in the second reporting process, cause the sound output apparatus not to output a sound for a determined period after causing the sound output apparatus to output a sound. In the eighth aspect, the period during which no sound is output is provided in consideration of a case where a user may feel annoyed when a sound is frequently output or a sound is continuously output for a long time. The processor may set the "determined period" in accordance with or not in accordance with designation by a user.

In a medical image processing apparatus according to a ninth aspect, in any one of the first to eighth aspects, the processor is configured to, in the first reporting process, change a mode of the first reporting process in accordance with a sound output state in the second reporting process. In the ninth aspect, for example, in a case where the second reporting process is performed (that is, in a case where the region of interest is continuously detected and the possibility of an instantaneous false positive is low), the processor is capable of increasing the identification intensity of the information that is displayed in a superimposed manner in the first reporting process, and is capable of reporting continuous detection by such a change in the mode of the first reporting process. The processor may change the mode of the first reporting process at the same time as the second reporting process (sound output), or before or after the second reporting process.

In a medical image processing apparatus according to a tenth aspect, in any one of the first to ninth aspects, the processor is configured to, in the first reporting process, perform the superimposed display of the information (information about the detected region of interest), the information being at least one of a character, a figure, or a symbol. The tenth aspect defines a specific mode of the information superimposed on the medical image. The processor may display, in a superimposed manner, information corresponding to the feature quantity of the region of interest.

To achieve the above-described object, an endoscope system according to an eleventh aspect of the present invention includes the medical image processing apparatus according to any one of the first to tenth aspects; an endoscope to be inserted into a subject, the endoscope having an imaging unit configured to capture the medical image; the display apparatus; and the sound output apparatus. The endoscope system according to the eleventh aspect includes the medical image processing apparatus according to any one of the first to tenth aspects and is thus capable of suppressing unnecessary sound output while reducing the possibility of oversight of a region of interest. The endoscope system according to the eleventh aspect may include a light source apparatus. The light source apparatus is capable of using, as observation light, normal light (white light), special light (narrow-band light), and a combination of normal light and special light. Preferably, the light source apparatus radiates observation light having different wavelength ranges in accordance with an organ, an area, an observation purpose, the type of an observation target, or the like.

To achieve the above-described object, a medical image processing method according to a twelfth aspect of the present invention is a medical image processing method to be executed by a medical image processing apparatus including a processor. The processor is configured to execute an image acquisition step of acquiring a time-series medical image; a region-of-interest detection step of detecting a region of interest from the acquired medical image; a display control step of causing a display apparatus to display the medical image; a first reporting step of, in response to the region of interest being detected in the region-of-interest detection step, causing the display apparatus to perform superimposed display of the medical image and information about the detected region of interest; and a second reporting step of, in response to the region of interest being detected in the region-of-interest detection step, outputting a sound from a sound output apparatus. The processor is configured to execute the second reporting step after the first reporting step. According to the twelfth aspect, as in the first aspect, it is possible to suppress unnecessary sound output while reducing the possibility of oversight of a region of interest. The medical image processing method according to the twelfth aspect may further include configurations similar to those according to the second to tenth aspects.

To achieve the above-described object, a medical image processing program according to a thirteenth aspect of the present invention is a medical image processing program that causes a medical image processing apparatus including a processor to execute a medical image processing method. The medical image processing method includes an image acquisition step of acquiring a time-series medical image; a region-of-interest detection step of detecting a region of interest from the acquired medical image; a display control step of causing a display apparatus to display the medical image; a first reporting step of, in response to the region of interest being detected in the region-of-interest detection step, causing the display apparatus to perform superimposed display of the medical image and information about the detected region of interest; and a second reporting step of, in response to the region of interest being detected in the region-of-interest detection step, outputting a sound from a sound output apparatus. The second reporting step is executed after the first reporting step. According to the thirteenth aspect, as in the first aspect and the twelfth aspect, it is possible to suppress unnecessary sound output while reducing the possibility of oversight of a region of interest. The medical image processing program according to the thirteenth aspect may be a program that causes a process similar to that according to the second to tenth aspects to be further executed. A non-transitory recording medium storing a computer-readable code of the program according to these aspects may be included in an aspect of the present invention.

As described above, with the medical image processing apparatus, the endoscope system, the medical image processing method, and the medical image processing program according to the present invention, it is possible to suppress unnecessary sound output while reducing the possibility of oversight of a region of interest.

BRIEF DESCRIPTION OF THE DRAWINGS

FIG. 8 is a diagram illustrating an example of a processing condition setting screen;

FIG. 11 is a diagram illustrating specific example 1 of sound output;

FIG. 13 is a diagram illustrating specific example 3 of sound output;

DESCRIPTION OF THE PREFERRED EMBODIMENTS

Hereinafter, an embodiment of a medical image processing apparatus, an endoscope system, a medical image processing method, and a medical image processing program according to the present invention will be described in detail with reference to the accompanying drawings.

First Embodiment

Configuration of Endoscope System

Figure 1:
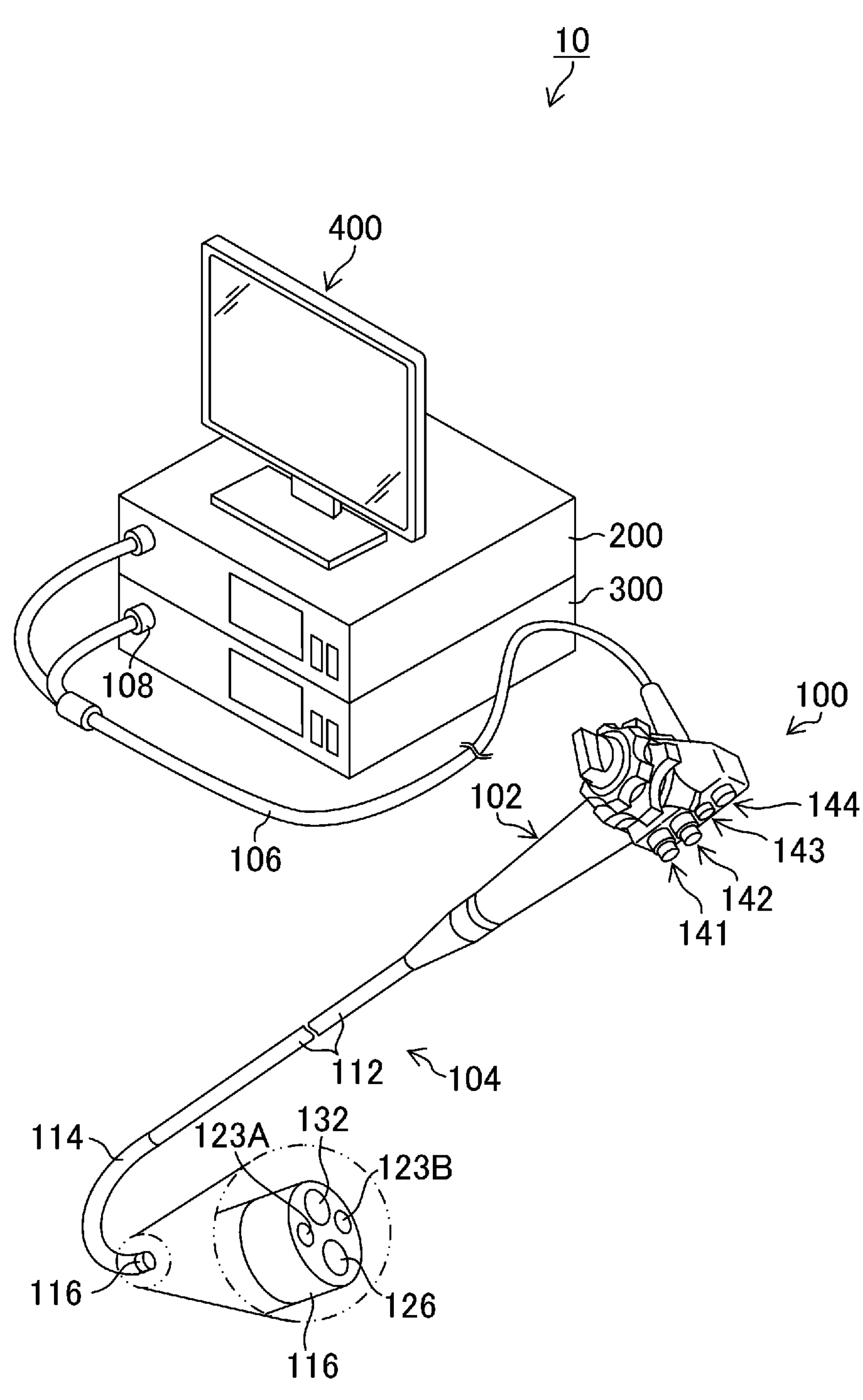
FIG. 1 is an external appearance diagram of an endoscope system according to a first embodiment.
Figure 2:
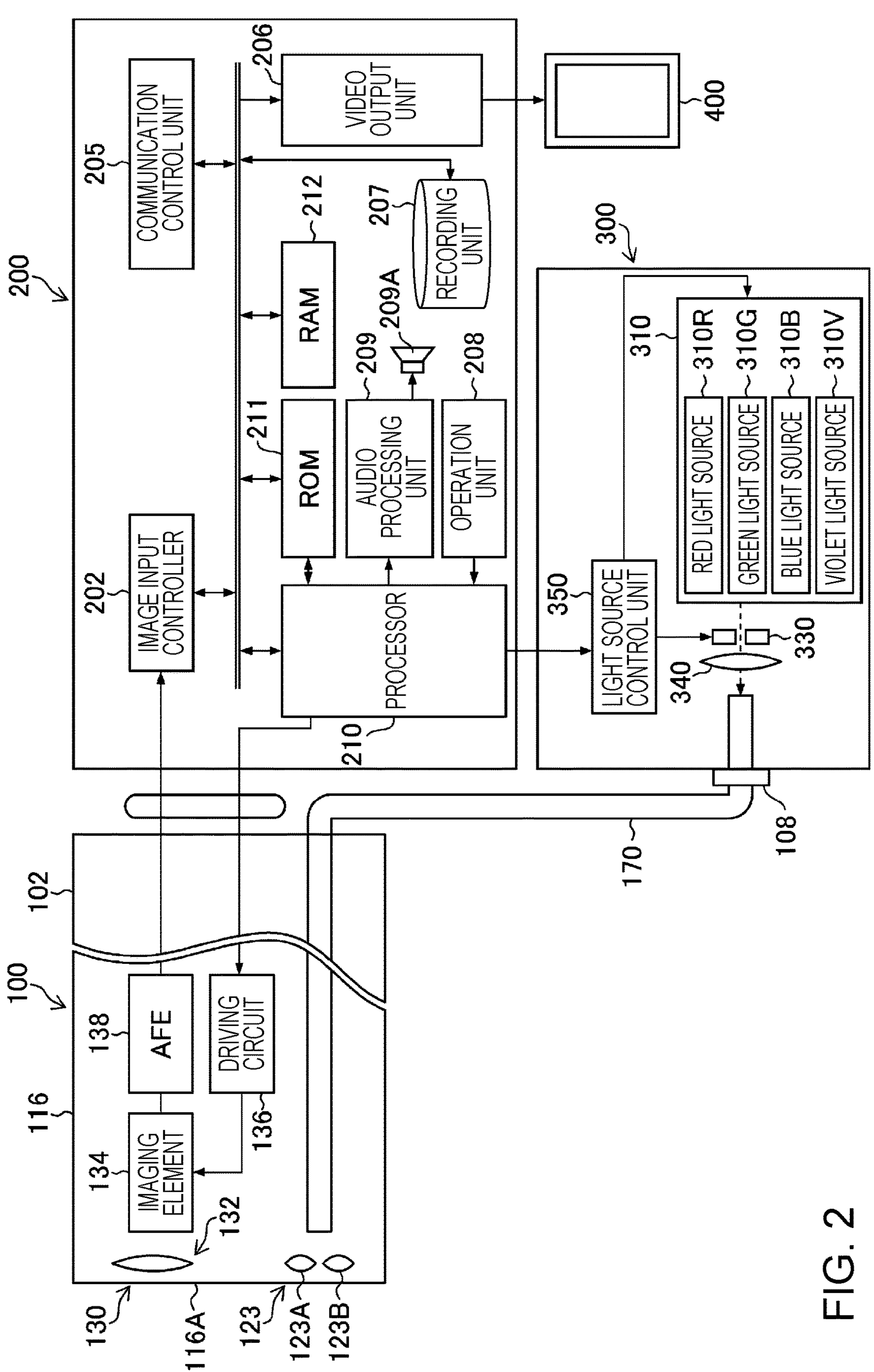
FIG. 2 is a diagram illustrating the configuration of a main part of the endoscope system.

FIG. 1 is an external appearance diagram of an endoscope system 10 (a medical image processing apparatus, an endoscope system) according to a first embodiment, and FIG. 2 is a block diagram illustrating the configuration of a main part of the endoscope system 10. As illustrated in FIGS. 1 and 2, the endoscope system 10 is constituted by an endoscope 100 (an endoscope, an imaging apparatus), a medical image processing unit 200 (a medical image processing apparatus, a processor), a light source apparatus 300 (a light source apparatus), and a monitor 400 (a display apparatus). An external apparatus (a determination apparatus) that determines the state of the endoscope 100 by using an electromagnetic wave, an ultrasonic wave, or magnetism may be connected to the endoscope system 10.

Configuration of Endoscope

The endoscope 100 includes a handheld operation section 102 and an insertion section 104 that communicates with the handheld operation section 102. An operator (a user) operates the handheld operation section 102 while grasping it and inserts the insertion section 104 into a body of a subject to perform observation. The handheld operation section 102 is provided with an air/water supply button 141, a suction button 142, a function button 143 to which various functions are allocated, and an imaging button 144 for receiving an imaging instruction operation (a still image, a moving image). The insertion section 104 is constituted by a soft part 112, a bending part 114, and a tip rigid part 116, which are arranged in this order from the handheld operation section 102 side. That is, the bending part 114 is connected to a base end side of the tip rigid part 116, and the soft part 112 is connected to a base end side of the bending part 114. The handheld operation section 102 is connected to a base end side of the insertion section 104. The user is able to change the orientation of the tip rigid part 116 in an up, down, left, or right direction by causing the bending part 114 to bend by operating the handheld operation section 102. The tip rigid part 116 is provided with an imaging optical system 130, an illumination unit 123, a forceps port 126, and so forth (see FIGS. 1 and 2).

During observation or treatment, an operation of an operation unit 208 (see FIG. 2) enables white light (normal light) and/or narrow-band light (special light: for example, one or more of red narrow-band light, green narrow-band light, blue narrow-band light, and violet narrow-band light) to be radiated from illumination lenses 123A and 123B of the illumination unit 123. In addition, an operation of the air/water supply button 141 enables washing water to be ejected from a water supply nozzle that is not illustrated, so that an imaging lens 132 (an imaging lens, an imaging unit) of the imaging optical system 130 and the illumination lenses 123A and 123B can be washed. The forceps port 126 opening in the tip rigid part 116 communicates with a pipe line that is not illustrated, so that a treatment tool that is not illustrated and is for extirpating a tumor or the like can be inserted into the pipe line and necessary treatment can be given to a subject by moving the treatment tool forward or backward as appropriate.

As illustrated in FIGS. 1 and 2, the imaging lens 132 (an imaging unit) is disposed on a distal-end-side surface 116A of the tip rigid part 116. An imaging element 134 (an imaging element, an imaging unit) of a complementary metal-oxide semiconductor (CMOS) type, a driving circuit 136, and an analog front end (AFE) 138 (an imaging unit) are disposed behind the imaging lens 132, and these elements output an image signal. The imaging element 134 is a color imaging element and includes a plurality of pixels constituted by a plurality of light-receiving elements arranged in a matrix (arranged two-dimensionally) in a specific pattern arrangement (Bayer arrangement, X-Trans (registered trademark) arrangement, honeycomb arrangement, or the like). Each pixel of the imaging element 134 includes a microlens, a red (R), green (G), or blue (B) color filter, and a photoelectric conversion unit (a photodiode or the like). The imaging optical system 130 is capable of generating a color image from pixel signals of three colors, red, green, and blue, and is also capable of generating an image from pixel signals of any one or two colors among red, green, and blue. In the first embodiment, a description will be given of a case where the imaging element 134 is a CMOS-type imaging element, but the imaging element 134 may be of a charge coupled device (CCD) type. Each pixel of the imaging element 134 may further include a violet color filter corresponding to a violet light source 310V and/or an infrared filter corresponding to an infrared light source.

An optical image of a subject is formed on a light-receiving surface (an imaging surface) of the imaging element 134 by the imaging lens 132, converted into an electric signal, output to the medical image processing unit 200 through a signal cable that is not illustrated, and converted into a video signal. Accordingly, an endoscopic image is displayed on the monitor 400, which is connected to the medical image processing unit 200.

The illumination lenses 123A and 123B of the illumination unit 123 are provided next to the imaging lens 132 on the distal-end-side surface 116A of the tip rigid part 116. An emission end of a light guide 170, which will be described below, is disposed behind the illumination lenses 123A and 123B. The light guide 170 extends through the insertion section 104, the handheld operation section 102, and a universal cable 106, and an incidence end of the light guide 170 is located in the light guide connector 108.

The handheld operation section 102 may include a scope information recording unit that is not illustrated and that records individual information (individual information, scope information) of the endoscope 100. The individual information includes, for example, the type (direct view, side view, or the like), model, individual identification number, optical system characteristics (viewing angle, distortion, and so forth), and so forth of the endoscope 100. A processor 210 (a scope information acquiring unit, an individual information acquiring unit) is capable of acquiring the individual information and using the individual information for medical image processing. The scope information recording unit may be provided in the light guide connector 108.

In the endoscope system 10, images of a subject are sequentially captured (under control of an imaging unit and an image acquiring unit 220 (see FIG. 3)) at a determined frame rate by using the endoscope 100 having the above-described configuration, and thereby time-series medical images can be sequentially acquired. A user performs observation while inserting or removing the endoscope 100 (the insertion section 104) into or from a living body as a subject.

Configuration of Light Source Apparatus

As illustrated in FIG. 2, the light source apparatus 300 is constituted by a light source 310 for illumination, a diaphragm 330, a condenser lens 340, a light source control unit 350, and so forth, and causes observation light to enter the light guide 170. The light source 310 includes a red light source 310R, a green light source 310G, a blue light source 310B, and the violet light source 310V that radiate red narrow-band light, green narrow-band light, blue narrow-band light, and violet narrow-band light, respectively, and is capable of radiating red narrow-band light, green narrow-band light, blue narrow-band light, and violet narrow-band light. The illuminance of observation light from the light source 310 is controlled by the light source control unit 350, which is capable of changing (increasing or decreasing) the illuminance of observation light or stopping illumination as necessary.

The light source 310 is capable of emitting red narrow-band light, green narrow-band light, blue narrow-band light, and violet narrow-band light in any combination. For example, the light source 310 is capable of simultaneously emitting red narrow-band light, green narrow-band light, blue narrow-band light, and violet narrow-band light to radiate white light (normal light) as observation light, and is also capable of emitting any one or two of red narrow-band light, green narrow-band light, blue narrow-band light, and violet narrow-band light to radiate narrow-band light (special light). The light source 310 may further include an infrared light source that radiates infrared light (an example of narrow-band light). Alternatively, with use of a light source that radiates white light and a filter that allows white light and each narrow-band light to pass therethrough, white light or narrow-band light may be radiated as observation light.

Wavelength Range of Light Source

The light source 310 may be a light source that generates light in a white range or light in a plurality of wavelength ranges as the light in the white range, or may be a light source that generates light in a specific wavelength range narrower than the white wavelength range. The specific wavelength range may be a blue range or green range in a visible range, or may be a red range in the visible range. In a case where the specific wavelength range is the blue range or green range in the visible range, the specific wavelength range may include a wavelength range of 390 nm or more and 450 nm or less or a wavelength range of 530 nm or more and 550 nm or less, and the light in the specific wavelength range may have a peak wavelength in the wavelength range of 390 nm or more and 450 nm or less or the wavelength range of 530 nm or more and 550 nm or less. In a case where the specific wavelength range is the red range in the visible range, the specific wavelength range may include a wavelength range of 585 nm or more and 615 nm or less or a wavelength range of 610 nm or more and 730 nm or less, and the light in the specific wavelength range may have a peak wavelength in the wavelength range of 585 nm or more and 615 nm or less or the wavelength range of 610 nm or more and 730 nm or less.

The above-described specific wavelength range may include a wavelength range in which a light absorption coefficient is different between oxyhemoglobin and deoxyhemoglobin, and the light in the specific wavelength range may have a peak wavelength in the wavelength range in which the light absorption coefficient is different between oxyhemoglobin and deoxyhemoglobin. In this case, the specific wavelength range may include a wavelength range of 400±10 nm, a wavelength range of 440±10 nm, a wavelength range of 470±10 nm, or a wavelength range of 600 nm or more and 750 nm, and the light in the specific wavelength range may have a peak wavelength in the wavelength range of 400±10 nm, the wavelength range of 440±10 nm, the wavelength range of 470±10 nm, or the wavelength range of 600 nm or more and 750 nm or less.

The wavelength range of the light generated by the light source 310 may include a wavelength range of 790 nm or more and 820 nm or less or a wavelength range of 905 nm or more and 970 nm or less, and the light generated by the light source 310 may have a peak wavelength in the wavelength range of 790 nm or more and 820 nm or less or the wavelength range of 905 nm or more and 970 nm or less.

Alternatively, the light source 310 may include a light source that radiates excitation light whose peak is 390 nm or more and 470 nm or less. In this case, a medical image (an inside-of-living-body image) having information about fluorescence emitted by a fluorescent substance in a subject (a living body) can be acquired. In the case of acquiring a fluorescence image, a pigment for a fluorescence method (fluorescein, acridine orange, or the like) may be used.

It is preferable that the type of the light source 310 (a laser light source, a xenon light source, a light-emitting diode (LED) light source, or the like), the wavelength of the light source 310, the presence or absence of a filter for the light source 310, and so forth be determined in accordance with the type, area, organ, purpose of observation, or the like of a photographic subject. It is also preferable that, during observation, the wavelengths of observation light be combined and/or switched in accordance with the type, area, organ, purpose of observation, or the like of a photographic subject. In the case of switching the wavelength, for example, a disc-shaped filter (a rotary color filter) that is disposed in front of the light source and that is provided with a filter for transmitting or blocking light of a specific wavelength may be rotated to switch the wavelength of light to be radiated.

The imaging element used to carry out the present invention is not limited to a color imaging element in which color filters are disposed for the individual pixels, such as the imaging element 134, and may be a monochrome imaging element. In the case of using a monochrome imaging element, imaging can be performed in a frame sequential (color sequential) manner by sequentially switching the wavelength of observation light. For example, the wavelength of outgoing observation light may be sequentially switched among violet, blue, green, and red, or wide-band light (white light) may be radiated and the wavelength of outgoing observation light may be switched by using a rotary color filter (red, green, blue, violet, and the like). Alternatively, one or a plurality of types of narrow-band light (green, blue, violet, and the like) may be radiated and the wavelength of outgoing observation light may be switched by using a rotary color filter (green, blue, violet, and the like). The narrow-band light may be infrared light of two or more different wavelengths.

As a result of connecting the light guide connector 108 (see FIGS. 1 and 2) to the light source apparatus 300, observation light radiated by the light source apparatus 300 is transmitted through the light guide 170 to the illumination lenses 123A and 123B and is radiated from the illumination lenses 123A and 123B to an observation range.

Configuration of Medical Image Processing Unit

The configuration of the medical image processing unit 200 will be described with reference to FIG. 2. In the medical image processing unit 200, an image input controller 202 receives an image signal output from the endoscope 100, the processor 210 (the image acquiring unit 220: a processor, a computer, a medical image processing apparatus) performs necessary image processing thereon, and a video output unit 206 outputs a resulting image signal. Accordingly, an observation image (a medical image) is displayed on the monitor 400 (a display apparatus). A communication control unit 205 controls communication with a hospital information system (HIS), a hospital local area network (LAN), and/or an external system or network that are not illustrated. In a recording unit 207 (a recording device), an image of a subject (an endoscopic image, a medical image), area information, information indicating a detection result, and the like are recorded. An audio processing unit 209 is capable of outputting a message (sound) about a detection result or a reporting process (a second reporting process) from a speaker 209A (a sound output apparatus) under control by the processor 210.

A read only memory (ROM) 211 is a nonvolatile storage element (a non-transitory recording medium) and stores a computer-readable code of a program that causes the processor 210 to execute various image processing methods. A random access memory (RAM) 212 is a storage element for temporary storage in various processing operations and can be used as a buffer at the time of acquiring an image.

A user is able to provide an instruction to execute medical image processing or designate a necessary condition for the execution via the operation unit 208, and a display control unit 232 (see FIG. 3) is capable of causing the monitor 400 to display a screen at the time of the instruction (for example, see FIG. 8), a detection result of a region of interest, and the like.

Functions of Processor

Figure 3:
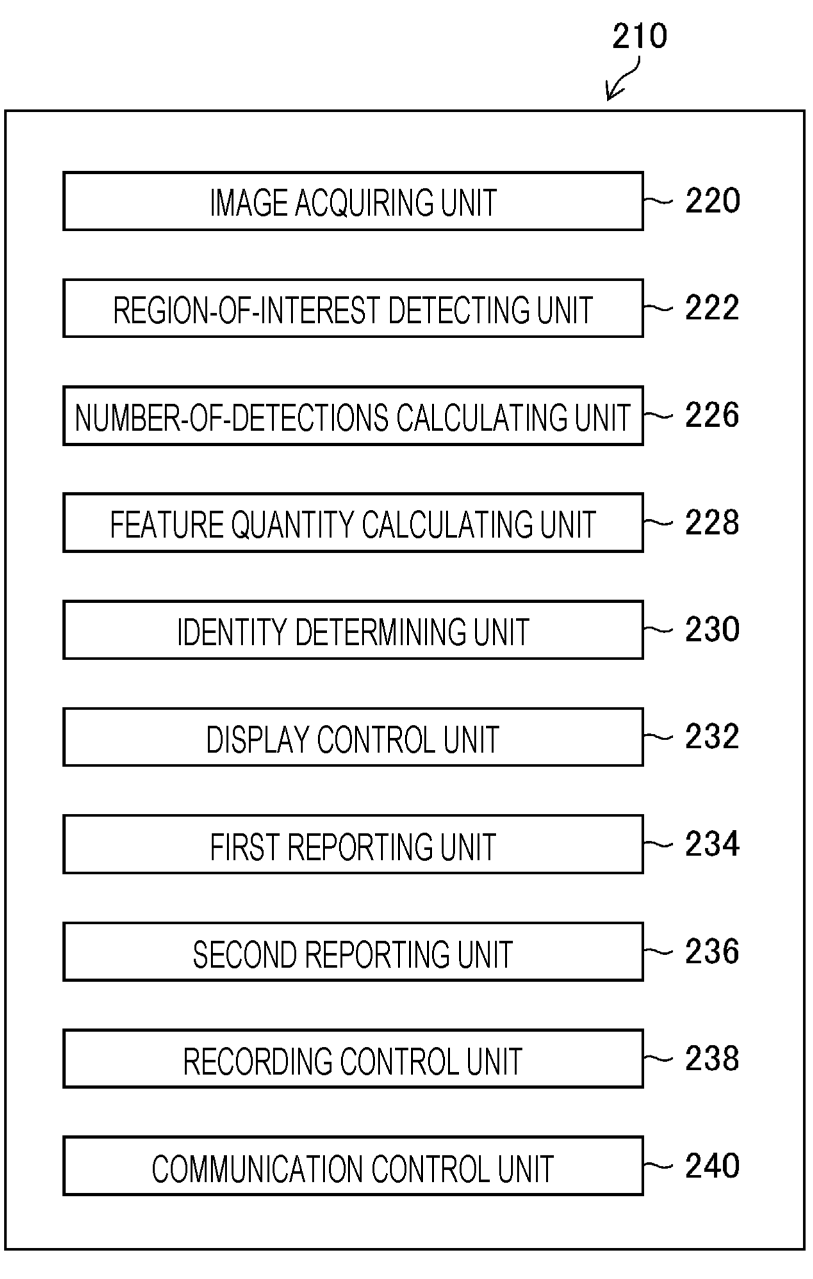
FIG. 3 is a block diagram illustrating a functional configuration of a processor.
Figure 4:
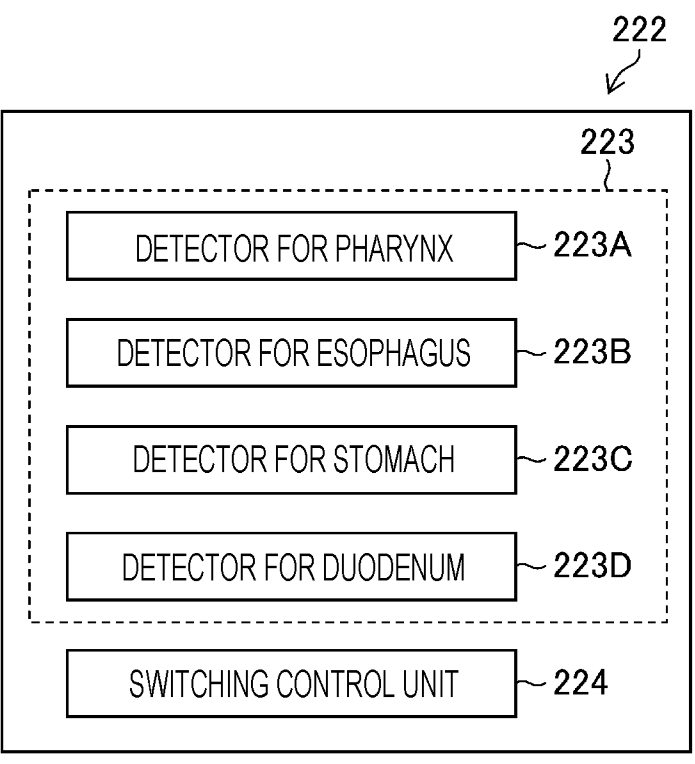
FIG. 4 is a diagram illustrating the configuration of a region-of-interest detecting unit.

FIG. 3 is a block diagram illustrating a functional configuration of the processor 210. The processor 210 includes an image acquiring unit 220 (an image acquiring unit), a region-of-interest detecting unit 222 (a region-of-interest detecting unit), a number-of-detections calculating unit 226 (a number-of-detections calculating unit), a feature quantity calculating unit 228 (a feature quantity calculating unit), an identity determining unit 230 (an identity determining unit), the display control unit 232 (a display control unit), a first reporting unit 234 (a first reporting unit), a second reporting unit 236 (a second reporting unit), a recording control unit 238 (a recording control unit), and a communication control unit 240. As illustrated in FIG. 4, the region-of-interest detecting unit 222 includes a detector 223 and a switching control unit 224. A detector 223 may be constituted by a plurality of detectors different in observation area, organ, detection algorithm, and the like, and includes a detector for pharynx 223A, a detector for esophagus 223B, a detector for stomach 223C, and a detector for duodenum 223D in the aspect illustrated in FIG. 4. The switching control unit 224 may switch the detector for which a detection result is to be displayed on the monitor 400 (a display apparatus) on the basis of an analysis result of an endoscopic image (an area, an organ, a line-of-sight direction, or the like), or on the basis of imaging information (information indicating the position and/or the direction of an imaging apparatus) acquired by the above-described external apparatus (a determination apparatus). The processor 210 may cause a plurality of detectors to operate and display a detection result obtained by one or some of the detectors, or may cause only a detector for which a detection result is to be displayed to operate.

The processor 210 is capable of performing, with the above-described functions, calculation of a feature quantity of a medical image, processing of emphasizing or reducing a component of a specific frequency band, and processing of emphasizing or deemphasizing a specific target (a region of interest, blood vessels at a desired depth, or the like). The processor 210 may include a special-light image acquiring unit that acquires a special-light image having information about a specific wavelength range on the basis of a normal-light image that is acquired by radiating light in the white range or light in a plurality of wavelength ranges as the light in the white range. In this case, a signal in the specific wavelength range can be acquired through computation based on color information of RGB (R: red, G: green, B: blue) or CMY (C: cyan, M: magenta, Y: yellow) included in the normal-light image. In addition, the processor 210 may include a feature quantity image generating unit that generates a feature quantity image through computation based on at least one of a normal-light image that is acquired by radiating light in the white range or light in a plurality of wavelength ranges as the light in the white range or a special-light image that is acquired by radiating light in a specific wavelength range, and may acquire and display the feature quantity image as a medical image.

The image acquiring unit 220 (a processor) may acquire, as a medical image, an endoscopic image (a medical image) captured by using observation light in a wavelength range suitable for the area indicated by area information, and the display control unit 232 may cause the monitor 400 (a display apparatus) to display a result of recognition for the medical image captured by using the observation light in the wavelength range. For example, an image captured by using white light (normal light) can be provided for detection (recognition) in the case of the stomach, and an image captured by using special light (blue narrow-band light), such as BLI (Blue Laser Imaging: registered trademark), can be provided for detection (recognition) in the case of the esophagus. In accordance with an area, the image acquiring unit 220 may acquire an image captured by using special light, such as LCI (Linked Color Imaging: registered trademark), and subjected to image processing (in the case of LCI, a difference in chroma or hue of a color close to a mucosal color is extended).

Medical image processing performed using the above-described functions will be described below in detail.

Detector Using Trained Model

The above-described detector can be constituted by using a trained model constituted through machine learning (a model trained by using an image set constituted by captured images of a living body), such as a convolutional neural network (CNN) or a support vector machine (SVM). Hereinafter, a description will be given of a layer configuration in a case where the detector 223 (the detector for pharynx 223A to the detector for duodenum 223D) is constituted by a CNN.

Examples of Layer Configuration of CNN

Figures 5A, 5B:
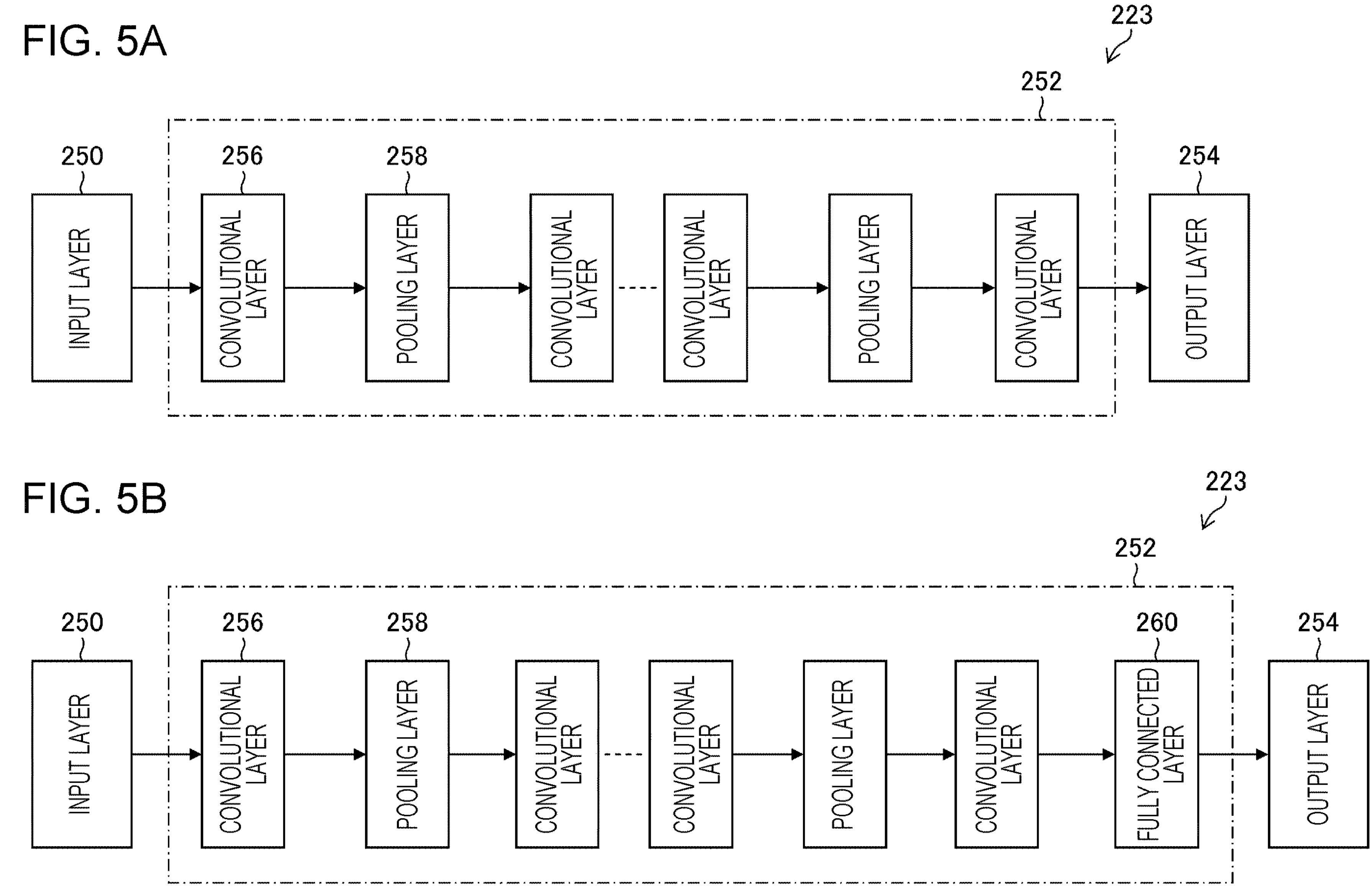
FIGS. 5A and 5B are diagrams illustrating examples of a layer configuration of a detector.

FIGS. 5A and 5B are diagrams illustrating examples of the layer configuration of the detector 223. In the example illustrated in FIG. 5A, the detector 223 includes an input layer 250, an intermediate layer 252, and an output layer 254. The input layer 250 receives an endoscopic image (a medical image) acquired by the image acquiring unit 220 and outputs a feature quantity. The intermediate layer 252 includes convolutional layers 256 and pooling layers 258, and receives the feature quantity output from the input layer 250 and calculates another feature quantity. These layers each have a structure in which a plurality of "nodes" are connected by "edges" and hold a plurality of weight parameters. The values of the weight parameters change as learning progresses. The detector 223 may include a fully connected layer 260 as in the example illustrated in FIG. 5B. The layer configuration of the detector 223 is not limited to the configuration in which the convolutional layers 256 and the pooling layers 258 are alternately arranged, and may include a plurality of consecutive convolutional layers 256 or pooling layers 258 (for example, convolutional layers 256). Alternatively, a plurality of consecutive fully connected layers 260 may be included.

Processing in Intermediate Layer

The intermediate layer 252 calculates a feature quantity through convolutional operation and pooling processing. The convolutional operation performed in the convolutional layer 256 is processing of acquiring a feature map through convolutional operation using a filter, and plays a role in feature extraction such as edge extraction from an image. As a result of the convolutional operation using a filter, one-channel (one) "feature map" is generated for one filter. The size of the "feature map" is scaled down by convolution and is reduced as convolution is performed in each layer. The pooling processing performed in the pooling layer 258 is processing of reducing (or enlarging) the feature map output through the convolutional operation to create a new feature map, and plays a role in giving robustness so that the extracted feature is not affected by parallel movement or the like. The intermediate layer 252 can be constituted by one or a plurality of layers that perform these processing operations.

Figure 6:
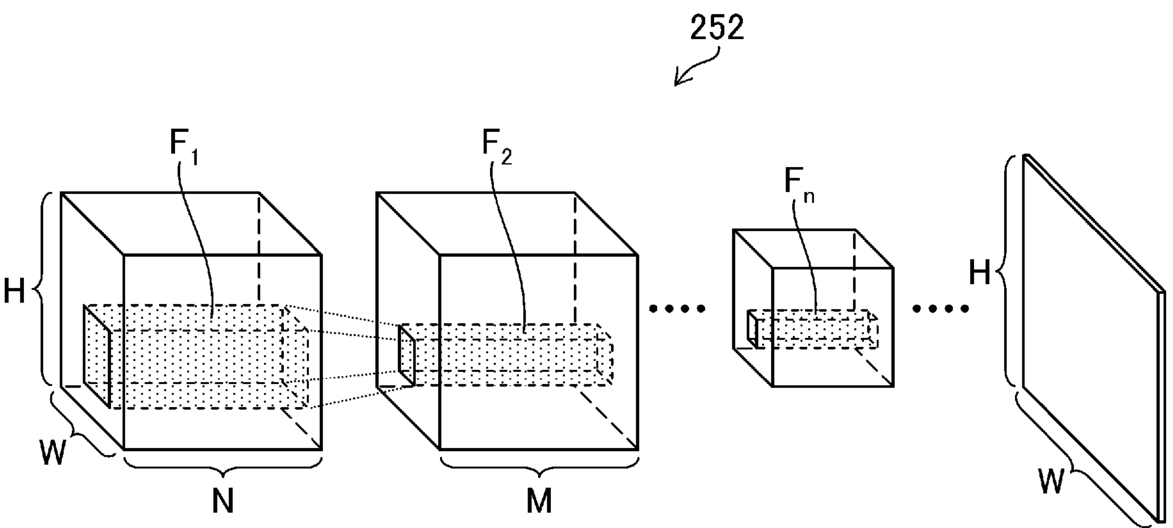
FIG. 6 is a diagram illustrating a state of convolutional processing using filters.

FIG. 6 is a diagram illustrating a state of convolutional processing using filters. In the first convolutional layer of the intermediate layer 252, convolutional operation of an image set constituted by a plurality of medical images (a learning image set in the case of learning, and a recognition image set in the case of recognition such as detection) and a filter $F_1$ is performed. The image set is constituted by N (N-channel) images each having an image size in which the height is represented by H and the width is represented by W. In the case of inputting normal-light images, the images constituting an image set are three-channel images of red (R), green (G), and blue (B). The filter $F_1$ convoluted with this image set has a filter size of 5×5×N in the case of the filter having size 5 (5×5), for example, because the image set has N channels (N images). As a result of convolutional operation using the filter $F_1$, one-channel (one) "feature map" is generated for one filter $F_1$. A filter $F_2$ used in the second convolutional layer has a filter size of 3×3×M in the case of the filter having size 3 (3×3), for example.

As in the first convolutional layer, in the second to n-th convolutional layers, convolutional operations using filters $F_2$ to $F_n$ are performed, respectively. The size of the "feature map" in the n-th convolutional layer is smaller than the size of the "feature map" in the second convolutional layer because scaling-down is performed in the convolutional layers or pooling layers in the preceding stages.

In the layers of the intermediate layer 252, lower-order feature extraction (extraction of edges or the like) is performed in a convolutional layer near the input side, and higher-order feature extraction (extraction of features about the shape, structure, and the like of an object) is performed near the output side. In the case of performing segmentation for the purpose of measurement or the like, scaling-up is performed in a convolutional layer in a latter-half portion, and the "feature map" having the same size as the input image set can be obtained in the last convolutional layer. On the other hand, in the case of performing object detection, it is sufficient to output position information and thus scaling-up is not necessary.

The intermediate layer 252 may include a layer for performing batch normalization in addition to the convolutional layers 256 and the pooling layers 258. Batch normalization processing is the processing of normalizing a data distribution in units of mini batches for performing learning, and plays a role in quickly performing learning, reducing dependency on an initial value, suppressing overtraining, and so forth.

Processing in Output Layer

The output layer 254 is a layer that detects the position of a region of interest depicted in an input medical image (a normal-light image, a special-light image) on the basis of the feature quantity output from the intermediate layer 252 and outputs the result thereof. In the case of performing segmentation, the output layer 254 grasps the position of a region of interest depicted in an image in the pixel level by using the "feature map" acquired from the intermediate layer 252. That is, the output layer 254 is capable of detecting, for each pixel of an endoscopic image, whether or not the pixel belongs to the region of interest, and outputting the detection result. On the other hand, in the case of performing object detection, determination in units of pixels is not necessary, and the output layer 254 outputs position information on the target.

The output layer 254 may execute discrimination (classification) of a lesion and output a discrimination result. For example, the output layer 254 may classify an endoscopic image into three categories "neoplastic", "non-neoplastic", and "others", and may output, as a discrimination result, three scores corresponding to "neoplastic", "non-neoplastic", and "others" (the sum of the three scores is 100%), or may output a classification result in a case where the endoscopic image can be clearly classified from the three scores. In the case of outputting a discrimination result, the intermediate layer 252 or the output layer 254 may or may not include a fully connected layer as the last one or plural layers (see FIG. 5B).

The output layer 254 may output a measurement result of a region of interest. In the case of performing measurement by using the CNN, for example, the region of interest as a target can be segmented in the above-described manner and then measurement can be performed by the processor 210 or the like on the basis of the result thereof. Alternatively, a measurement value of the region of interest as a target can be output directly from the detector 223. In the case where the measurement value is directly output, the image is caused to learn the measurement value, and thus regression of the measurement value occurs.

In the case of using the CNN having the above-described configuration, it is preferable to perform, in a learning procedure, a process of comparing a result output from the output layer 254 with a correct answer of recognition for the image set to calculate loss (error), and updating the weight parameters in the intermediate layer 252 from the layer on the output side toward the layer on the input side so that the loss is reduced (backpropagation).

Recognition Using Method Other Than CNN

The detector 223 may perform detection by using a method other than the CNN. For example, a region of interest can be detected on the basis of a feature quantity of pixels of an acquired medical image. In this case, the detector 223 divides a detection target image into, for example, a plurality of rectangular regions, sets the rectangular regions obtained through the division as local regions, calculates, for each local region in the detection target image, a feature quantity (for example, hue) of pixels in the local region, and determines a local region having a specific hue among the local regions as a region of interest. Similarly, the detector 223 may perform classification or measurement based on a feature quantity.

Modification of Configuration of Detector

The detectors constituting the detector 223 (the detector for pharynx 223A to the detector for duodenum 223D) may each be constituted by a plurality of detectors for observation light beams in different wavelength ranges (for example, a detector for normal light and a detector for special light). In this case, preferably, the detector for normal light and the detector for special light are trained models constituted through machine learning using normal-light images and special-light images, respectively.

Although the configuration of the detector has mainly been described with reference to FIGS. 5A, 5B, and 6, a classifier or a measurer may be provided instead of or in addition to the detector in the present invention. Alternatively, a detector, a classifier, or a measurer may be separated for normal light and special light.

Implementation of Functions by Various Types of Processors

The functions of the above-described processor 210 can be implemented by using various types of processors and a recording medium. The various types of processors include, for example, a central processing unit (CPU), which is a general-purpose processor that executes software (program) to implement various functions. Also, the various types of processors include a graphics processing unit (GPU), which is a processor dedicated to image processing, and a programmable logic device (PLD), which is a processor whose circuit configuration is changeable after manufacturing, such as a field programmable gate array (FPGA). In the case of performing processing on an image as in the present invention, the configuration using a GPU is effective. Furthermore, the various types of processors include a dedicated electric circuit which is a processor having a circuit configuration designed exclusively for executing specific processing, such as an application specific integrated circuit (ASIC).

The function of each unit may be implemented by one processor or may be implemented by a plurality of processors of the same type or different types (for example, a combination of a plurality of FPGAs, a combination of a CPU and an FPGA, or a combination of a CPU and a GPU). A plurality of functions may be implemented by one processor. A first example of implementing a plurality of functions by one processor is that a combination of one or more CPUs and software constitute one processor and the one processor implements the plurality of functions, as represented by a computer. A second example is that a processor that implements the functions of an entire system by one integrated circuit (IC) chip is used, as represented by a system on chip (SoC). In this way, various functions are configured as a hardware structure by using one or more of the above-described various types of processors. Furthermore, the hardware structure of the various types of processors is, more specifically, electric circuitry formed by combining circuit elements such as semiconductor elements. The electric circuitry may be electric circuitry that implements the above-described functions by using logical disjunction, logical conjunction, logical negation, exclusive disjunction, and logical operation as a combination thereof.

When the above-described processor or electric circuitry executes the software (program), the code of the software to be executed that is readable by a computer (for example, the various types of processors or electric circuitry constituting the processor 210, and/or a combination thereof) is stored in a non-transitory recording medium, such as the read only memory (ROM) 211, and the computer refers to the software. The software stored in the non-transitory recording medium includes a medical image processing program for executing the medical image processing method according to the present invention and data used for the execution (data used to set a display mode or a reporting mode, a weight parameter used in the detector 223, and so forth). The code may be recorded on a non-transitory recording medium, such as a magneto-optical recording device of various types or a semiconductor memory, instead of the ROM 211. In the processing using the software, the random access memory (RAM, a memory) 212 may be used as a transitory storage region, for example, and data stored in an electrically erasable and programmable read only memory (EEPROM) that is not illustrated can be referred to, for example. The recording unit 207 may be used as a "non-transitory recording medium".

Information Recorded in Recording Unit

In the recording unit 207, an endoscopic image (a medical image), a processed endoscopic image (a processed medical image) on which image processing has been performed, imaging information (information indicating an imaging position and/or an imaging direction of the endoscopic image), a detection result, a processing condition (a condition for performing detection or reporting), and the like are recorded. Other information may also be recorded. The recording control unit 238 records these pieces of information in association with each other.

Medical Image Processing

Figure 7:
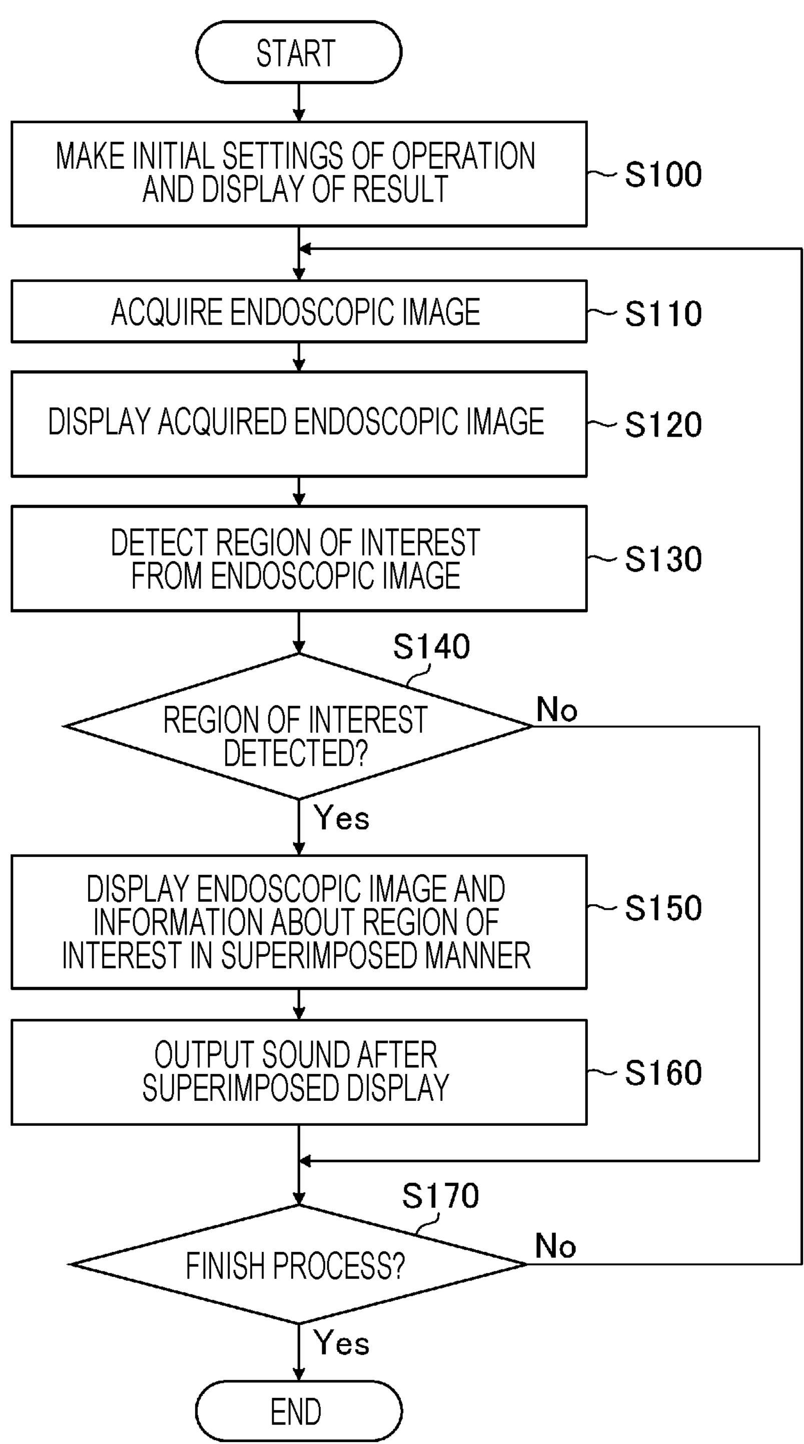
FIG. 7 is a flowchart illustrating a procedure of a medical image processing method according to the first embodiment.

Medical image processing in the endoscope system 10 having the above-described configuration (execution of the medical image processing method and the medical image processing program according to the present invention) will be described. FIG. 7 is a flowchart illustrating a procedure of the medical image processing method according to the first embodiment. Hereinafter, a description will be given of the case of detecting a region of interest by the detector 223. Also in the case of performing classification or measurement, processing can be performed in a similar manner. The procedure described below may be executed in different order as necessary.

Initial Setting

Figure 8:
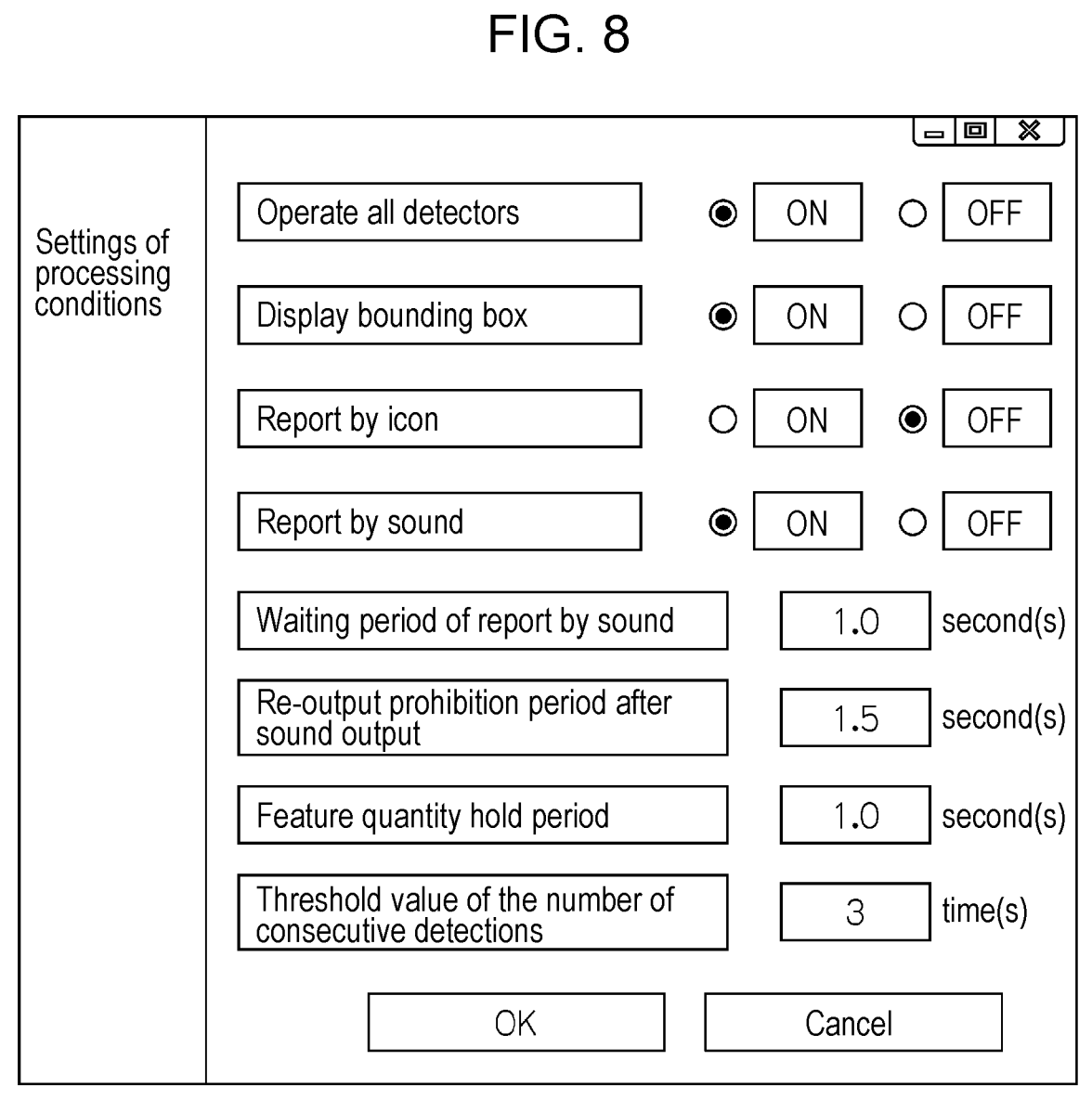

The processor 210 sets conditions necessary for executing the medical image processing method/program (step S100: an initial setting step) on the basis of a user operation via the operation unit 208 and/or preset processing conditions (for example, default processing conditions). For example, the processor 210 designates a detector to be operated, sets a condition of switching or selecting a detector, and sets the mode of displaying or reporting a detection result (setting of displaying or hiding; characters, figures, symbols, and the colors thereof to be displayed; a condition of sound output, or the like). The processor 210 may cause all of the plurality of detectors constituting the detector 223 to operate (in this case, display of a detection result may be performed for one or some of the detectors), or may cause one or some of the detectors to operate and stop a detector (detection process) for which a detection result is not to be displayed on the monitor 400 (a display apparatus). The user is able to set processing conditions via a screen as illustrated in FIG. 8, for example. In the example in FIG. 8, the user is able to set processing conditions by turning ON/OFF radio buttons or inputting numerical values to numerical value input fields via the operation unit 208. The processor 210 is capable of setting processing conditions not only at the start of processing but also during execution of the steps described below.

Acquisition of Endoscopic Image

The image acquiring unit 220 (a processor, an image acquiring unit) acquires an endoscopic image (a medical image) captured in a living body of a subject (step S110: an image acquisition process, an image acquisition step). The image acquiring unit 220 is capable of acquiring a time-series endoscopic image (medical image) in real time by performing sequential imaging of the inside of the living body as the subject at a predetermined frame rate by using the imaging unit (the imaging lens 132, the imaging element 134, the AFE 138, and so forth) of the endoscope 100. The image acquiring unit 220 may acquire, in non-real time, an endoscopic image that has already been captured and recorded. For example, the image acquiring unit 220 may acquire an endoscopic image or a processed endoscopic image recorded in the recording unit 207, or may acquire an image from an external apparatus or system via the communication control unit 205. The display control unit 232 (a processor, a display control unit) causes the monitor 400 (a display apparatus) to display the acquired endoscopic image (step S120: a display control process, a display control step).

Detection of Region of Interest

The detector 223 (a processor) detects a region of interest from the endoscopic image (a medical image) by using the detector 223 (step S130: a region-of-interest detection process, a region-of-interest detection step). The detector 223 is capable of performing a plurality of detection processes by using a plurality of detectors among the detectors constituting the detector 223. In detection of a region of interest, the detector 223 is capable of grasping the position of the region of interest in an image in the pixel level (i.e., detecting, for each pixel of the endoscopic image, whether the pixel belongs to the region of interest) by using the above-described “feature map”, and outputting a detection result. Examples of a region of interest (a region of concern) detected by the endoscope system 10 include a polyp, a cancer, a large intestine diverticulum, inflammation, a treatment scar (an endoscopic mucosal resection (EMR) scar, an endoscopic submucosal dissection (ESD) scar, a clip portion, or the like), a bleeding point, a perforation, blood vessel atypia, or various treatment tools. In the case of an ultrasonic apparatus such as an ultrasonic endoscope, an organ or a vessel may be detected as a region of interest.

The processor 210 may perform detection or reporting of a region of interest for all the frames of the acquired endoscopic image, or intermittently (at a predetermined frame interval).

Preferably, the switching control unit 224 (a processor) switches the detector for which a detection result is to be displayed on the monitor 400 (a display apparatus) in accordance with the organ or area of an observation target, imaging information, or the like (a switching process, a switching step). If the detector as a switching destination is not operating, the switching control unit 224 causes the detector to start a detection process. The switching control unit 224 may stop the operation (a detection process) of a detector for which a detection result is not to be displayed on the monitor 400 (a display apparatus). As a result of switching the detector (recognizer) in this way, an appropriate diagnosis assistance function (a detection result obtained by the detector) can be provided to the user.

Reporting When Region of Interest is Detected

If the detector 223 detects a region of interest (YES in step S140), the first reporting unit 234 (a processor) causes the monitor 400 (a display apparatus) to display information about the detected region of interest and the endoscopic image (medical image) in a superimposed manner (step S150: a first reporting process, a first reporting step). After the superimposed display (the first reporting process), the second reporting unit 236 (a processor) causes a sound to be output from the speaker 209A (a sound output apparatus) (step S160: a second reporting process, a second reporting step). The details and specific modes of the reporting will be described below. The processor 210 repeats the process of steps S110 to S160 until it is determined that “the process is to be finished” (YES in step S170) as a result of the end of acquisition of an endoscopic image or a user operation.

Specific Modes of Superimposed Display

Figures 9A, 9B, 9C, 9D:
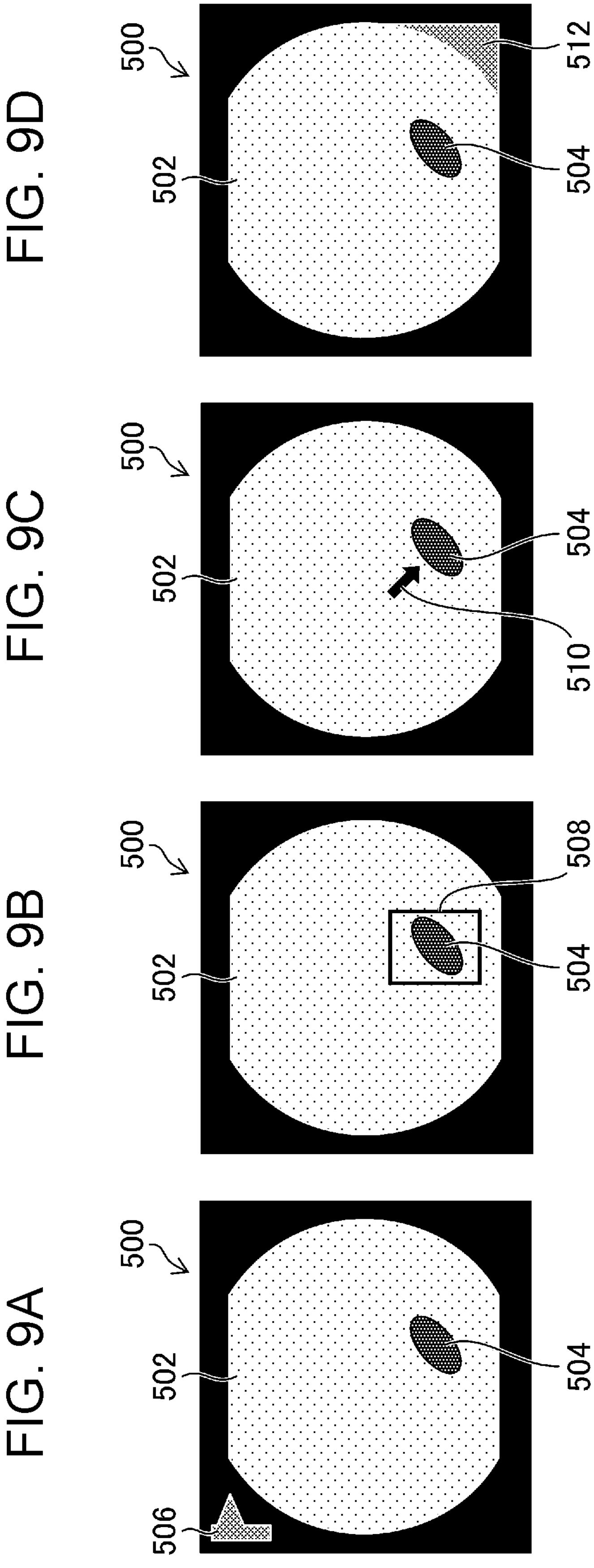
FIGS. 9A to 9D are diagrams illustrating examples of superimposed display (a first reporting process)

FIGS. 9A to 9D are diagrams illustrating examples of superimposed display (a first reporting process). In each of FIGS. 9A to 9D, an endoscopic image 502 is displayed on a screen 500 of the monitor 400. If a region of interest 504 is detected from the endoscopic image 502, the first reporting unit 234 (a processor) causes at least one of a character, a figure, or a symbol to be displayed, as “information regarding the region of interest”, in a superimposed manner on the endoscopic image 502. For example, as illustrated in FIG. 9A, the first reporting unit 234 may display an icon 506 (a flag-shaped figure or symbol) in a superimposed manner outside the region of the endoscopic image 502. The first reporting unit 234 may perform superimposed display at the position of the region of interest 504 (within the region of the endoscopic image 502) as illustrated in FIG. 9B (a bounding box 508 (a figure) in FIG. 9B), or may perform superimposed display at a position away from the region of interest 504 as illustrated in FIG. 9C (an arrow 510 (a figure, a symbol) in FIG. 9C).

The first reporting unit 234 may perform superimposed display at a position independent of the position of the region of interest 504, or may perform superimposed display at a position corresponding to the position of the region of interest 504. For example, in the example illustrated in the FIG. 9D, the first reporting unit 234 colors a region 512 at the lower right portion of the screen 500 in response to the region of interest 504 being at the lower right portion of the endoscopic image 502. In the case of performing superimposed display at the position corresponding to the position of the region of interest 504, it is preferable that, in response to the position or the like of the region of interest in the endoscopic image being changed, the first reporting unit 234 move the position where the information is displayed in a superimposed manner accordingly. At the time of performing superimposed display, the first reporting unit 234 may combine changes in color and brightness.

Details of Reporting By Sound

Even if a certain target object such as a region of interest is continuously detected, if an identical target object is not continuously detected, the possibility of a false positive is high, and thus no sound is to be output. Accordingly, in a first mode, the identity between regions of interest is determined as described below, and a sound is output on the basis of the determination result.

Figure 10:
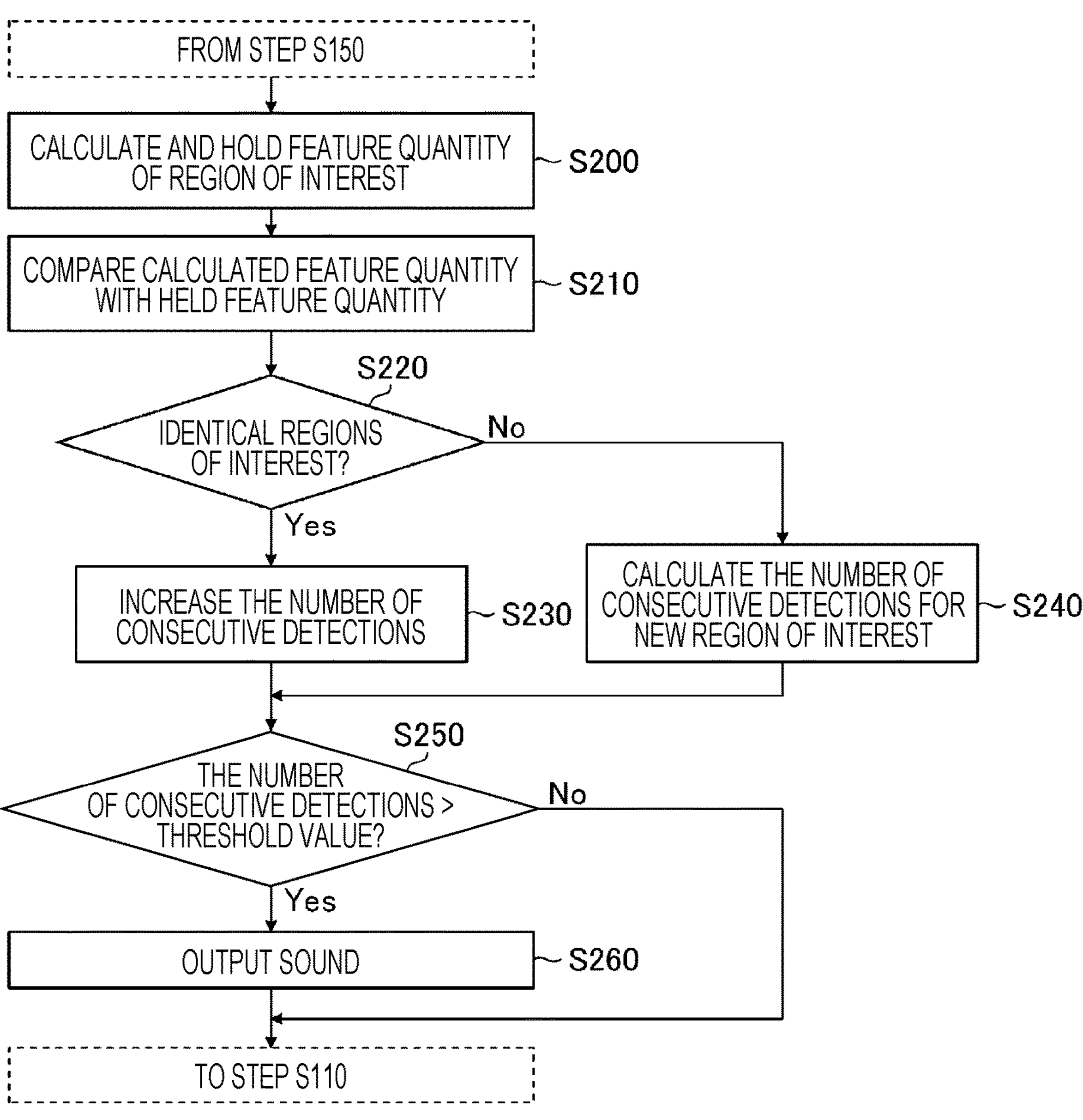
FIG. 10 is a flowchart illustrating the details of reporting by a sound (a second reporting process)

FIG. 10 is a flowchart illustrating the details of reporting by a sound in step S160 (a second reporting process, a second reporting step). After the first reporting process is performed in step S150, the feature quantity calculating unit 228 (a processor) calculates and holds the feature quantity of the region of interest (step S200: a feature quantity calculation process/a feature quantity calculation step, a feature quantity hold process/a feature quantity hold step). The “feature quantity” is, for example, a type, a position, a size, a shape, a color, or the like. The feature quantity calculating unit 228 is capable of calculating the feature quantity on the basis of analysis of the endoscopic image or an output of the detector 223. The feature quantity calculating unit 228 may hold the calculated feature quantity in a transitory recording medium such as the RAM 212, or may hold (record) the calculated feature quantity in a non-transitory recording medium such as the recording unit 207. Here, the “transitory holding” includes, for example, a mode in which feature quantities are sequentially deleted upon end of processing, a mode in which a feature quantity is erased at the time of power OFF, and the like.

The identity determining unit 230 (a processor) compares the calculated feature quantity with the held feature quantity to determine the identity between the regions of interest (step S210: an identity determination process, an identity determination step). The determination of identity may be performed on the basis of the number of consecutive detections of a region of interest. Specifically, the identity determining unit 230 compares the feature quantity of a region of interest (a first region of interest) detected from an endoscopic image (a medical image) captured at a first time with the feature quantity (the feature quantity held by the feature quantity calculating unit 228) of a region of interest (a second region of interest) detected from an endoscopic image (a second medical image) captured at a second time (a time before the first time), thereby determining the identity between the first region of interest and the second region of interest. The second time may be a determined period before the first time. The user is able to specify the value of the "determined period" via a screen for setting processing conditions as illustrated in FIG. 8.

In accordance with the determination result obtained in the identity determination process, the second reporting unit 236 calculates the number of consecutive detections for the first region of interest. Specifically, if the first region of interest and the second region of interest are identical (YES in step S220), the second reporting unit 236 increases the number of consecutive detections for the second region of interest to calculate the number of consecutive detections for the first region of interest (step S230: a number-of-detections calculation process, a number-of-detections calculation step). On the other hand, if the first region of interest and the second region of interest are not identical (NO in step S220), the second reporting unit 236 calculates the number of consecutive detections, with the first region of interest being regarded as a new region of interest (step S240: a number-of-detections calculation process, a number-of-detections calculation step). As in the above-described case of a feature quantity, the second reporting unit 236 may hold the calculated number of consecutive detections in a transitory recording medium such as the RAM 212, or may hold (record) the calculated number of consecutive detections in a non-transitory recording medium such as the recording unit 207. Here, the "transitory holding" includes, for example, a mode in which the numbers are sequentially deleted upon end of processing, a mode in which the number is erased at the time of power OFF, and the like.

The identity determining unit 230 may determine the identity between the regions of interest on the basis of tracking by the detector 223, the overlap of the positions of the regions of interest, or an optical flow calculated from the endoscopic image. The "optical flow" is obtained by estimating and vectorizing the movement of a portion included in an image or the entire photographic subject on the basis of corresponding points between images or the like.

The identity determining unit 230 and the second reporting unit 236 (a processor) may perform the determination of identity and the calculation of the number of consecutive detections for all the frames of an endoscopic image, or intermittently. For example, in a case where the frame rate of an endoscopic image is 30 fps (frames per second), the determination of identity may be performed at 30 fps or less than 30 fps (for example, 10 fps). The determination of identity may be performed in accordance with the frame rate of the detector 223.

If the number of consecutive detections calculated in this manner exceeds a threshold value (YES in step S250), the second reporting unit 236 causes a sound to be output from the speaker 209A (a sound output apparatus) (step S260: a second reporting process, a second reporting step).

Figure 11:
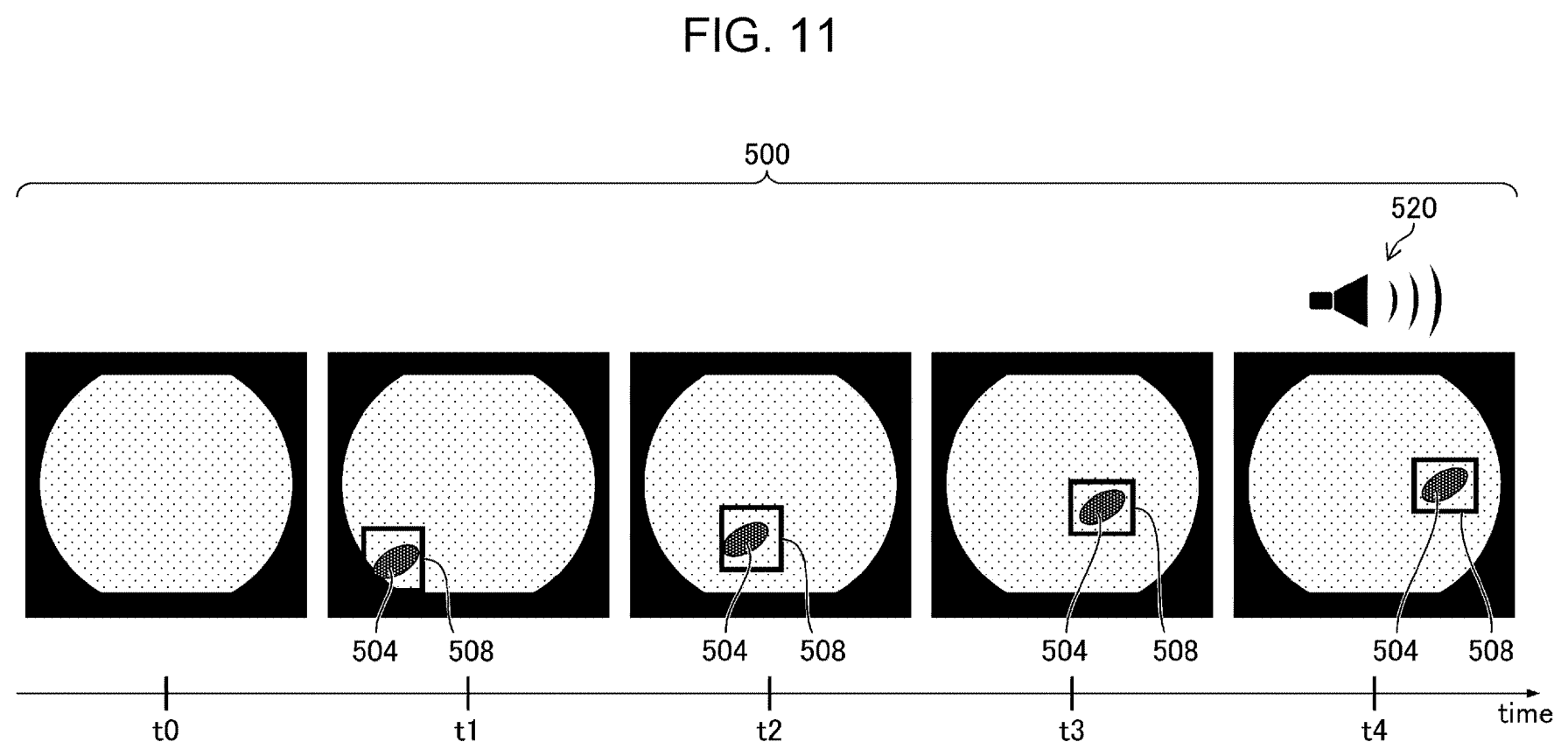

Specific Example 1 of Sound Output: Case where the Number of Consecutive Detections Exceeds Threshold Value FIG. 11 is a diagram illustrating specific example 1 of sound output. In the example in FIG. 11, no region of interest is detected at time to, and the region of interest 504 is detected and superimposed display of the bounding box 508 (a first reporting process) is started at time t1. Also at times t2, t3, and t4, the identical region of interest 504 is detected and superimposed display is performed. In such a situation, when the threshold value of the number of consecutive detections is 3, the number of consecutive detections is 4, which exceeds the threshold value, at time t4 (i.e., the identical region of interest 504 is detected after a first period (=t2−t1) elapses from when the region of interest 504 is detected at time t1). Thus, the second reporting unit 236 causes a sound to be output from the speaker 209A. FIG. 11 illustrates that an icon 520 of a speaker indicates that a sound is output (the icon need not be displayed on the screen 500, the same applies to the following examples). In this way, the second reporting unit 236 (a processor) executes sound output after superimposed display.

Figure 12:
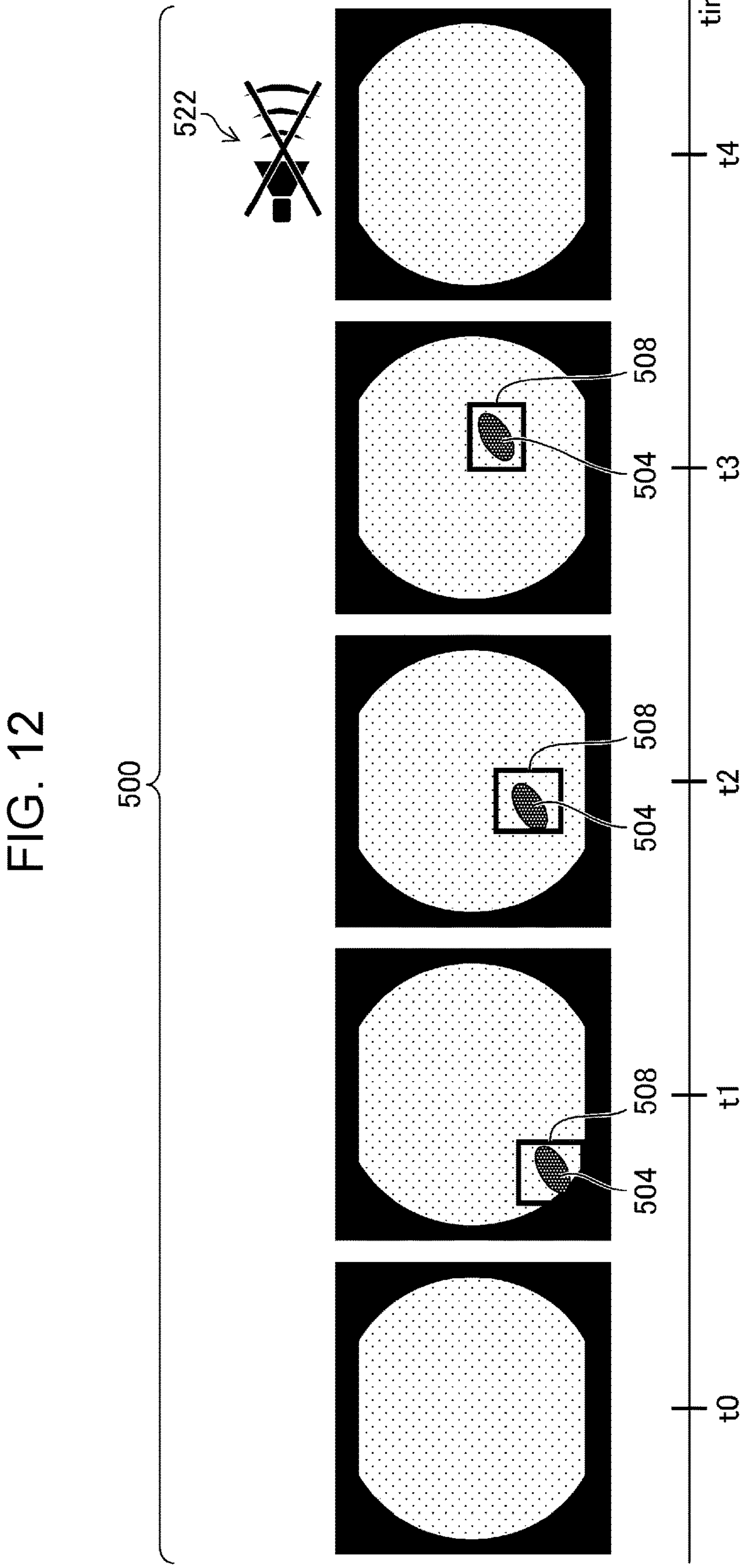
FIG. 12 is a diagram illustrating specific example 2 of sound output.

Specific Example 2 of Sound Output: Case where the Number of Consecutive Detections does not Exceed Threshold Value FIG. 12 is a diagram illustrating specific example 2 of sound output. In the example illustrated in FIG. 12, the identical region of interest 504 is detected and the bounding box 508 is displayed in a superimposed manner from time t1 to time t3 (a first reporting process), but the region of interest 504 is not detected at time t4 (i.e., the identical region of interest 504 is not detected after a first period elapses from when the region of interest 504 is detected at time t1). Thus, the number of consecutive detections (3) does not exceed the threshold value (3) (NO in step S250), and the second reporting unit 236 does not output a sound. FIG. 12 illustrates that an icon 522 with a cross indicates that a sound is not output.

As described above, a false positive (the detector 223 determines a region that is not a region of interest to be a region of interest) instantaneously occurs in many cases, and is less likely to occur continuously. Thus, if a region of interest is detected instantaneously (from time t1 to time t3) as in the example illustrated in FIG. 12, no sound may be output to reduce the possibility that the user feels annoyed due to the sound output as a result of a false positive. Meanwhile, the region of interest is highlighted by screen display (a first reporting process), which attracts the user's attention, and an effect of preventing oversight of a lesion or the like can be expected.

Figure 13:
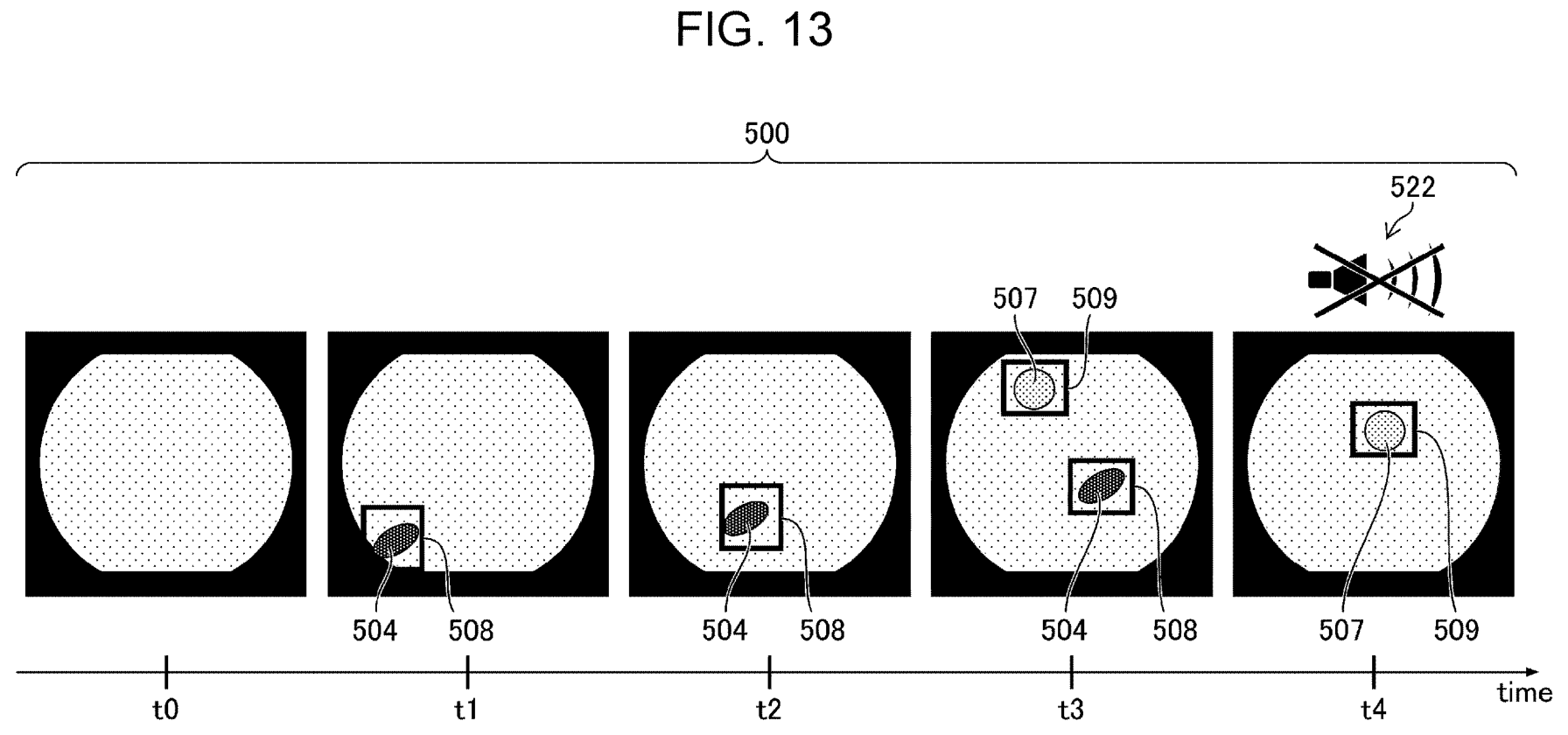

Specific Example 3 of Sound Output: Case of Determining Identity Between Regions of Interest FIG. 13 is a diagram illustrating specific example 3 of sound output in the case of determining the identity between regions of interest. In the example in FIG. 13, regions of interest (regions of interest 504 and 507) are detected at time t1 to time t4, and bounding boxes 508 and 509 are displayed in a superimposed manner (a first reporting process). However, the number of detections of the region of interest 504 is 3 (time t1 to time t3) and the number of detections of the region of interest 507 is 2 (time t3 and time t4), and thus the second reporting unit 236 does not output a sound at time t4.

Accordingly, it is possible to suppress unnecessary sound output due to an instantaneous false positive.

Specific Example 4 of Sound Output: Example Regarding Period of Determining Identity In detection of a region of interest using AI such as the detector 223, a false negative (in which AI determines that "a region of interest is absent" although a region of interest is present in an endoscopic image) is an inevitable problem, as well as a false positive. For example, as in the example illustrated in FIG. 14, a situation may occur in which "although regions of interest (regions of interest 504A and 504B) are detected from an endoscopic image at times t1, t2, and t4, a region of interest (region of interest 504A) is not detected at time t3 due to a determination error of the detector 223". In this case, a problem "the number of consecutive detections is not appropriately calculated, and a sound is not output although the sound is to be output" may occur. Accordingly, the number-of-detections calculating unit 226, the identity determining unit 230, and the second reporting unit 236 (a processor) include, in the determination target of the identity of a region of interest, not only the region of interest in the immediately preceding frame but also the region of interest in a further preceding frame.

Figure 14:
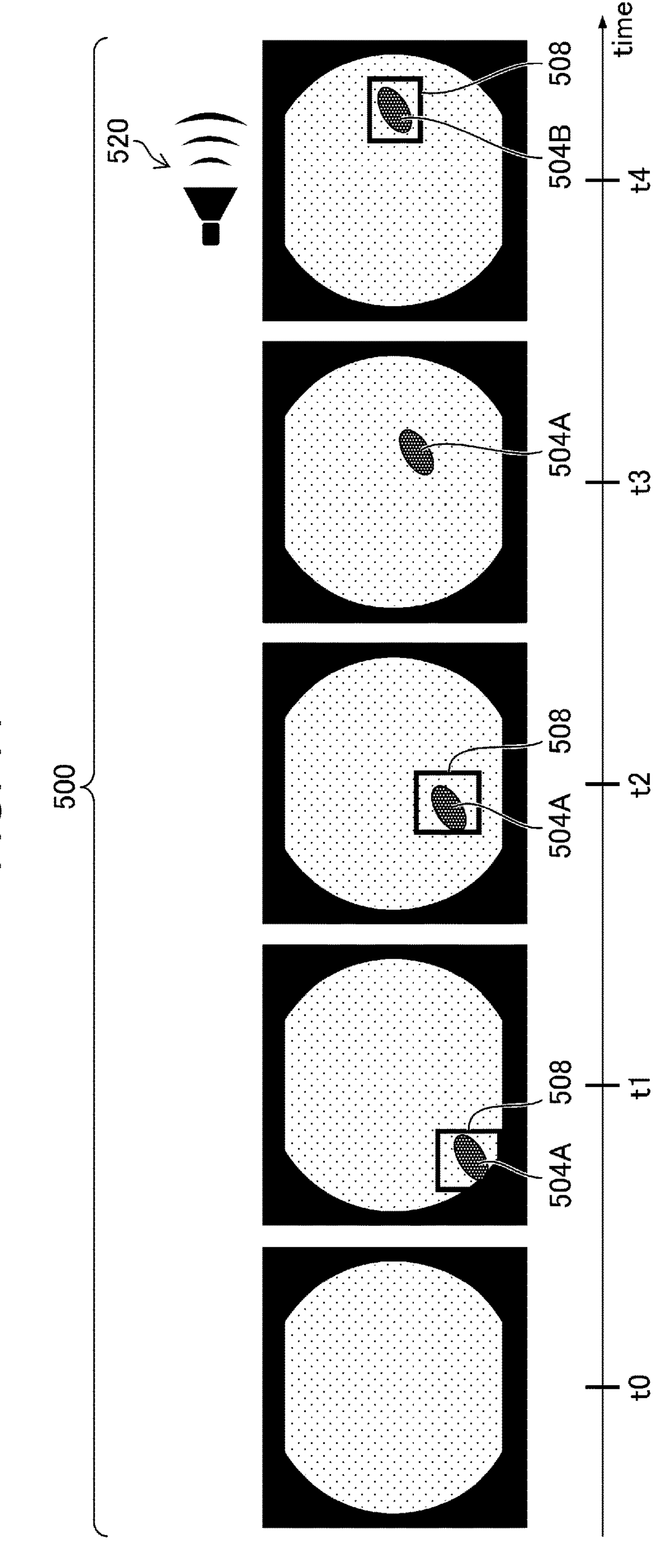
FIG. 14 is a diagram illustrating specific example 4 of sound output.

In the example in FIG. 14, a case is assumed where the identity determining unit 230 compares detection results (presence or absence of a region of interest, a feature quantity) of the region of interest 504B detected at time t4 and the region of interest 504A detected at time t2 and determines that the detection results are "identical". In this case, the number-of-detections calculating unit 226 increases the number of consecutive detections of the region of interest 504A. Accordingly, the number of consecutive detections at time t4 is 4, which exceeds the threshold value (3). Thus, the second reporting unit 236 causes a sound to be output from the speaker 209A at time t4 (indicated by the icon 520 at time t4 in FIG. 14). Such determination of identity makes it possible to avoid a problem that the number of consecutive detections is not appropriately calculated due to a false negative. Calculation for far past frames may cause problems of an increased calculation cost and a decreased accuracy of identity determination. Thus, it is preferable that a past frame to be compared be limited to a frame obtained at a time near the time of a current frame (time t4 (first time) in the example in FIG. 14), that is, a time within a determined preceding period; time t2 (second time).

In the example in FIG. 14, the number-of-detections calculating unit 226 and the identity determining unit 230 may perform control such that "the number of consecutive detections is maintained at 3, but a determination that the identical region of interest is continuously detected is continued", instead of determining the number of consecutive detections to be "4". In such a case of maintaining the number of consecutive detections without increasing the number, if the identical region of interest 504A is detected in the frame next to the frame of time t4, the number of consecutive detections is increased to 4, and reporting by sound output is performed.

Specific Example 5 of Sound Output: Example of Limiting Sound Output

Figure 15:
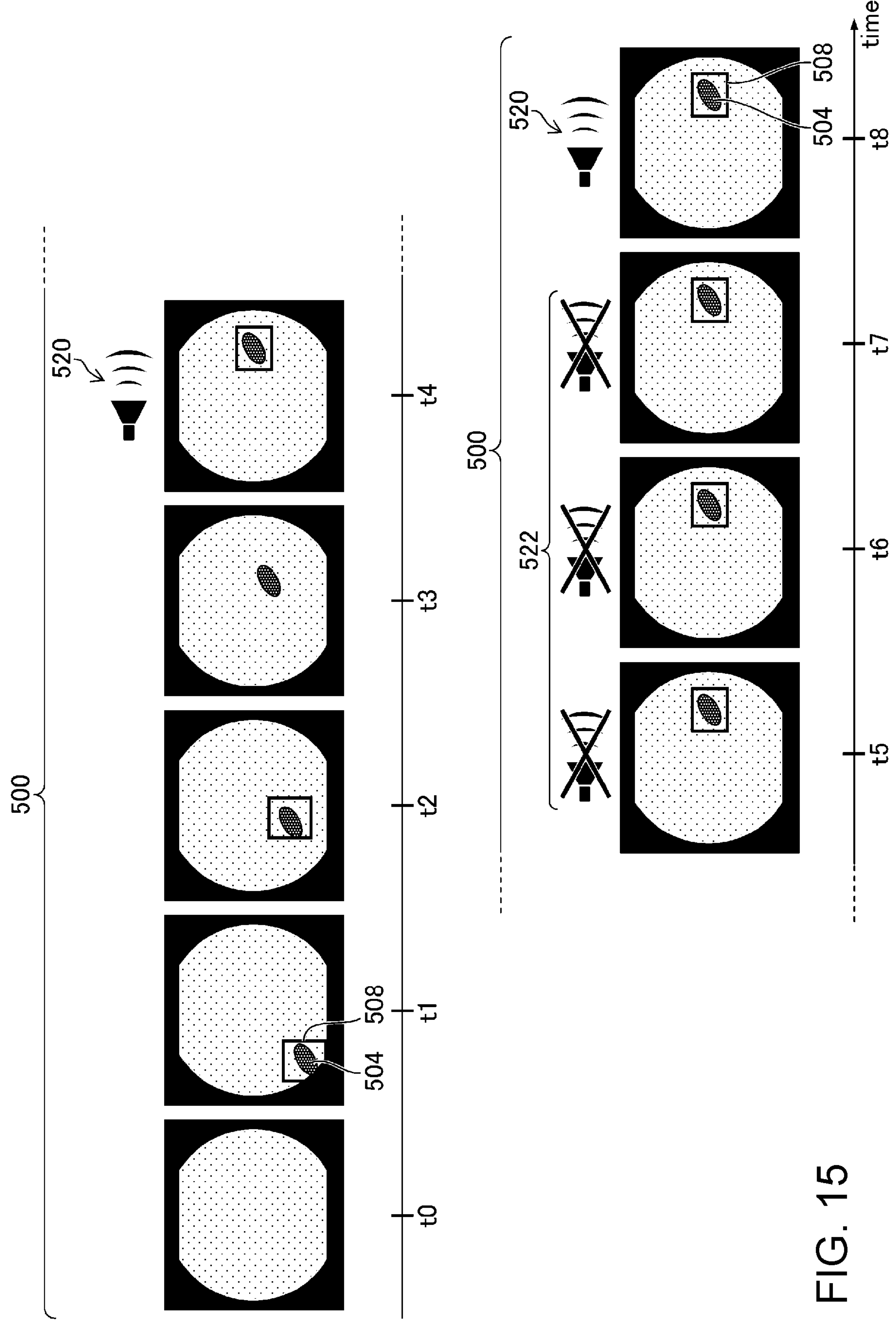
FIG. 15 is a diagram illustrating specific example 5 of sound output.

In the endoscope system 10, in reporting by sound output (a second reporting process), control may be performed such that no sound is output after the number of consecutive detections exceeds a determined number. For example, in the example in FIG. 15, a sound is output at time t4 when the number of consecutive detections is 4. However, the second reporting unit 236 (a processor) causes no sound to be output during a determined period from time t5 when the number of consecutive detections is 5 (three frames to time t7). Accordingly, it is possible to avoid a problem that the user feels annoyed due to frequent occurrence of sound output. In the example in FIG. 15, no sound output is canceled at time t8 when the determined period elapses. Even after the cancellation, control may be performed such that no sound is output while the identical target (a region of interest) is detected (in this case, no sound is output also from time t8). In this way, it is possible to avoid a problem that sound output frequently occurs during observation of the identical target and the user feels annoyed.

Figure 16:
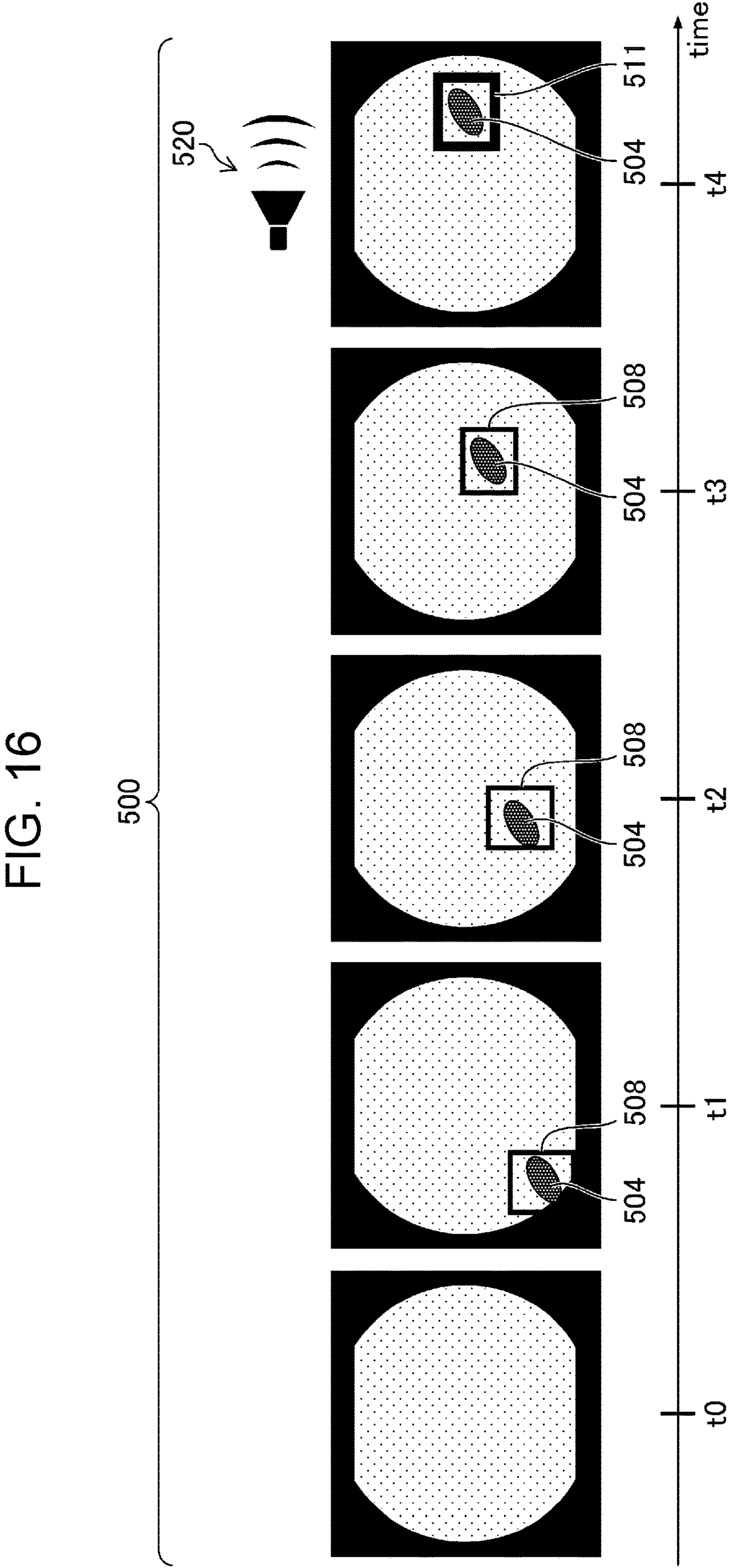
FIG. 16 is a diagram illustrating specific example 6 of sound output.

Specific Example 6 of Sound Output: Example in which Mode of Superimposed Display is in Conjunction with Sound Output State In the endoscope system 10, the mode of screen display (superimposed display: a first reporting process) may be changed in accordance with a sound output state in a second reporting process. For example, in the example in FIG. 16, a sound is output from time t4 at which the number of consecutive detections is 4 and exceeds the threshold value. The first reporting unit 234 (a processor) makes the frame line of a bounding box 511 displayed in a superimposed manner on the region of interest 504 thicker than that of the bounding box 508 at times t1 to t3. To change of the mode of screen display in accordance with a sound output state, the color, size, or shape of a figure or the like to be displayed in a superimposed manner may be changed. Alternatively, superimposed display of another figure or the like as in the examples in FIGS. 9A to 9D may be combined. Such a change in the mode of screen display makes it possible to intuitively notify the user that the endoscope system 10 is reporting a detection target with higher reliability. The first reporting unit 234 may change the mode of screen display at the same time as or around the time of a change in a sound output state (start/stop of sound output or the like) (time t4 in the examples in FIGS. 9A to 9D).

As described above, according to the first embodiment, it is possible to suppress unnecessary sound output while reducing the possibility of oversight of a region of interest.

Application to Other Medical Images

In the above-described first embodiment, a description has been given of the case of performing recognition by using an endoscopic image (an optical endoscopic image), which is one aspect of a medical image. The medical image processing apparatus, the medical image processing method, and the medical image processing program according to the present invention can also be applied to the case of using a medical image other than an endoscopic image, such as images obtained in an ultrasonic endoscope apparatus (ultrasonic endoscope system) or an ultrasound image diagnosis apparatus, or the like.

APPENDICES

In addition to the above-described embodiment and modification, the configurations described below are included in the scope of the present invention.

Appendix 1

A medical image processing apparatus wherein a medical image analysis processing unit detects a region of interest on the basis of a feature quantity of pixels of a medical image, the region of interest being a region to be focused on, and a medical image analysis result acquiring unit acquires an analysis result of the medical image analysis processing unit.

Appendix 2

A medical image processing apparatus wherein a medical image analysis processing unit detects presence or absence of a target to be focused on, on the basis of a feature quantity of pixels of a medical image, and a medical image analysis result acquiring unit acquires an analysis result of the medical image analysis processing unit.

Appendix 3

The medical image processing apparatus wherein the medical image analysis result acquiring unit acquires the analysis result of the medical image from a recording device that records the analysis result, and the analysis result is either or both of the region of interest which is a region to be focused on included in the medical image and the presence or absence of the target to be focused on.

Appendix 4

The medical image processing apparatus wherein the medical image is a normal-light image acquired by radiating light in a white range or light in a plurality of wavelength ranges as the light in the white range.

Appendix 5

The medical image processing apparatus wherein the medical image is an image acquired by radiating light in a specific wavelength range, and the specific wavelength range is a range narrower than a white wavelength range.

Appendix 6

The medical image processing apparatus wherein the specific wavelength range is a blue or green range in a visible range.

Appendix 7

The medical image processing apparatus wherein the specific wavelength range includes a wavelength range of 390 nm or more and 450 nm or less or a wavelength range of 530 nm or more and 550 nm or less, and the light in the specific wavelength range has a peak wavelength in the wavelength range of 390 nm or more and 450 nm or less or the wavelength range of 530 nm or more and 550 nm or less.

Appendix 8

The medical image processing apparatus wherein the specific wavelength range is a red range in a visible range.

Appendix 9

The medical image processing apparatus wherein the specific wavelength range includes a wavelength range of 585 nm or more and 615 nm or less or a wavelength range of 610 nm or more and 730 nm or less, and the light in the specific wavelength range has a peak wavelength in the wavelength range of 585 nm or more and 615 nm or less or the wavelength range of 610 nm or more and 730 nm or less.

Appendix 10

The medical image processing apparatus wherein the specific wavelength range includes a wavelength range in which a light absorption coefficient is different between oxyhemoglobin and deoxyhemoglobin, and the light in the specific wavelength range has a peak wavelength in the wavelength range in which the light absorption coefficient is different between oxyhemoglobin and deoxyhemoglobin.

Appendix 11

The medical image processing apparatus wherein the specific wavelength range includes a wavelength range of 400±10 nm, a wavelength range of 440±10 nm, a wavelength range of 470±10 nm, or a wavelength range of 600 nm or more and 750 nm or less, and the light in the specific wavelength range has a peak wavelength in the wavelength range of 400±10 nm, the wavelength range of 440±10 nm, the wavelength range of 470±10 nm, or the wavelength range of 600 nm or more and 750 nm or less.

Appendix 12

The medical image processing apparatus wherein the medical image is an inside-of-living-body image depicting an inside of a living body, and the inside-of-living-body image has information about fluorescence emitted by a fluorescent substance in the living body.

Appendix 13

The medical image processing apparatus wherein the fluorescence is acquired by irradiating the inside of the living body with excitation light whose peak is 390 nm or more and 470 nm or less.

Appendix 14

The medical image processing apparatus wherein the medical image is an inside-of-living-body image depicting an inside of a living body, and the specific wavelength range is a wavelength range of infrared light.

Appendix 15

The medical image processing apparatus wherein the specific wavelength range includes a wavelength range of 790 nm or more and 820 nm or less or a wavelength range of 905 nm or more and 970 nm or less, and the light in the specific wavelength range has a peak wavelength in the wavelength range of 790 nm or more and 820 nm or less or the wavelength range of 905 nm or more and 970 nm or less.

Appendix 16

The medical image processing apparatus wherein a medical image acquiring unit includes a special-light image acquiring unit that acquires a special-light image having information about the specific wavelength range on the basis of a normal-light image that is acquired by radiating light in a white range or light in a plurality of wavelength ranges as the light in the white range, and the medical image is the special-light image.

Appendix 17

The medical image processing apparatus wherein a signal in the specific wavelength range is acquired through computation based on color information of RGB or CMY included in the normal-light image.

Appendix 18

The medical image processing apparatus including a feature quantity image generating unit that generates a feature quantity image through computation based on at least one of a normal-light image or a special-light image, the normal-light image being acquired by radiating light in a white range or light in a plurality of wavelength ranges as the light in the white range, the special-light image being acquired by radiating light in a specific wavelength range, wherein the medical image is the feature quantity image.

Appendix 19

An endoscope apparatus including:

the medical image processing apparatus according to any one of appendices 1 to 18; and an endoscope that acquires an image by radiating at least any one of light in a white wavelength range or light in a specific wavelength range.

Appendix 20

A diagnosis assistance apparatus including the medical image processing apparatus according to any one of appendices 1 to 18.

Appendix 21

A medical work assistance apparatus including the medical image processing apparatus according to any one of appendices 1 to 18.

The embodiment of the present invention and other examples have been described above. The present invention is not limited to the above-described aspects, and various modifications can be made without deviating from the spirit of the present invention.

REFERENCE SIGNS LIST

10 endoscope system
100 endoscope
102 handheld operation section
104 insertion section
106 universal cable
108 light guide connector
112 soft part
114 bending part
116 tip rigid part
116A distal-end-side surface
123 illumination unit
123A illumination lens
123B illumination lens

126 forceps port
130 imaging optical system
132 imaging lens
134 imaging element
136 driving circuit
141 air/water supply button
142 suction button
143 function button
144 imaging button
170 light guide
200 medical image processing unit
202 image input controller
205 communication control unit
206 video output unit
207 recording unit
208 operation unit
209 audio processing unit
209A speaker
210 processor
211 ROM
212 RAM
220 image acquiring unit
222 region-of-interest detecting unit
223 detector
223A detector for pharynx
223B detector for esophagus
223C detector for stomach
223D detector for duodenum
224 switching control unit
226 number-of-detections calculating unit
228 feature quantity calculating unit
230 identity determining unit
232 display control unit
234 first reporting unit
236 second reporting unit
238 recording control unit
240 communication control unit
250 input layer
252 intermediate layer
254 output layer
256 convolutional layer
258 pooling layer
260 fully connected layer
300 light source apparatus
310 light source
310B blue light source
310G green light source
310R red light source
310V violet light source
330 diaphragm
340 condenser lens
350 light source control unit
400 monitor
500 screen
502 endoscopic image
504 region of interest
504A region of interest
504B region of interest
506 icon
507 region of interest
508 bounding box
509 bounding box
510 arrow
511 bounding box
512 region
520 icon
522 icon $F_1$ filter $F_2$ filter

S100-S260 individual steps of medical image processing method

What is claimed is:

1. A medical image processing apparatus comprising a processor, the processor being configured to:

execute an image acquisition process of acquiring a time-series medical image;

execute a region-of-interest detection process of detecting a region of interest from the acquired medical image;

execute a display control process of causing a display apparatus to display the medical image;

execute a first reporting process of, in response to the region of interest being detected in the region-of-interest detection process, causing the display apparatus to superimpose and display information about the detected region of interest on the medical image;

execute a feature quantity hold process of holding a feature quantity of the detected region of interest;

execute an identity determination process of comparing a feature quantity of a first region of interest detected from a medical image captured at a first time with the held feature quantity of a second region of interest detected from a second medical image captured at a second time that is a time before the first time, thereby determining identity between the first region of interest and the second region of interest;

execute a number-of-detections calculation process of calculating the number of consecutive detections for the first region of interest:

in response to a determination being made in the identity determination process that the first region of interest and the second region of interest are identical to each other, in the number-of-detections calculation process, increase the number of consecutive detections recorded for the second region of interest to calculate the number of consecutive detections of the first region of interest;

determine, while the first reporting process is being executed, whether the detection is a continuous detection based on the number of consecutive detections;

in a case where the detection is determined to be the continuous detection, execute a second reporting process of, in response to the region of interest being detected in the region-of-interest detection process, outputting a sound from a sound output apparatus along with the first reporting process; and in a case where the detection is determined not to be the continuous detection, not execute the second reporting process.

2. The medical image processing apparatus according to claim 1, wherein the processor is configured to execute the second reporting process in response to the region of interest being detected after a first period elapses from when the region of interest is detected in the region-of-interest detection process in a case where the detection is determined to be the continuous detection, and is configured not to execute the second reporting process in response to the region of interest not being detected after the first period elapses in a case where the detection is determined not to be the continuous detection.

3. The medical image processing apparatus according to claim 1, wherein the processor is configured to, in the first reporting process, cause the display apparatus to superimpose and display the information in accordance with a position of the region of interest in the medical image.

4. The medical image processing apparatus according to claim 1, wherein the processor is configured to determine that the detection is the continuous detection in response to the number of consecutive detections exceeding a predetermined number.

5. The medical image processing apparatus according to claim 4, wherein the processor is configured to, in the number-of-detections calculation process, calculate the number of consecutive detections for the first region of interest in accordance with a determination result obtained in the identity determination process.

6. The medical image processing apparatus according to claim 1, wherein the processor is configured to, in the second reporting process, cause the sound output apparatus not to output a sound for a determined period after causing the sound output apparatus to output a sound.

7. The medical image processing apparatus according to claim 1, wherein the processor is configured to, in the first reporting process, change a mode of the first reporting process in accordance with a sound output state in the second reporting process.

8. The medical image processing apparatus according to claim 1, wherein the processor is configured to, in the first reporting process, cause the display apparatus to superimpose and display the information, the information being at least one of a character, a figure, or a symbol.

9. An endoscope system comprising:

the medical image processing apparatus according to claim 1;

an endoscope to be inserted into a subject, the endoscope having an imaging unit configured to capture the medical image;

the display apparatus; and the sound output apparatus.

10. A medical image processing method to be executed by a medical image processing apparatus comprising a processor, wherein the medical image processing method comprises:

executing an image acquisition process of acquiring a time-series medical image;

executing a region-of-interest detection process of detecting a region of interest from the acquired medical image;

executing a display control process of causing a display apparatus to display the medical image;

executing a first reporting process of, in response to the region of interest being detected in the region-of-interest detection process, causing the display apparatus to superimpose and display information about the detected region of interest on the medical image;

executing a feature quantity hold process of holding a feature quantity of the detected region of interest;

executing an identity determination process of comparing a feature quantity of a first region of interest detected from a medical image captured at a first time with the held feature quantity of a second region of interest detected from a second medical image captured at a second time that is a time before the first time, thereby determining identity between the first region of interest and the second region of interest;

executing a number-of-detections calculation process of calculating the number of consecutive detections for the first region of interest;

determining, while the first reporting process is being executed, whether the detection is a continuous detection based on the number of consecutive detections;

in response to a determination being made in the identity determination process that the first region of interest and the second region of interest are identical to each other, in the number-of-detections calculation process, increasing the number of consecutive detections recorded for the second region of interest to calculate the number of consecutive detections of the first region of interest;

determining, while the first reporting process is being executed, whether the detection is a continuous detection based on the number of consecutive detections;

in a case where the detection is determined to be the continuous detection, executing a second reporting process of, in response to the region of interest being detected in the region-of-interest detection process, outputting a sound from a sound output apparatus along with the first reporting process; and in a case where the detection is determined not to be the continuous detection, not executing the second reporting process.

11. A non-transitory computer-readable recording medium storing a program for causing, when read by a computer, the computer to execute the medical image processing method according to claim 10.

12. A medical image processing apparatus comprising a processor, the processor being configured to:

execute an image acquisition process of acquiring a time-series medical image;

execute a region-of-interest detection process of detecting a region of interest from the acquired medical image;

execute a display control process of causing a display apparatus to display the medical image;

execute a first reporting process of, in response to the region of interest being detected in the region-of-interest detection process, causing the display apparatus to superimpose and display information about the detected region of interest on the medical image;

execute a feature quantity hold process of holding a feature quantity of the detected region of interest;

execute an identity determination process of determining an identity by comparing, of the feature quantity held in the feature quantity hold process, a feature quantity obtained at a time that is within a determined period before a first time, with a feature quantity of a first region of interest detected from a medical image captured at the first time;

determine, while the first reporting process is being executed, whether the detection is a continuous detection based on a result of the identity determination process;

in a case where the detection is determined to be the continuous detection, execute a second reporting process of, in response to the region of interest being detected in the region-of-interest detection process, outputting a sound from a sound output apparatus along with the first reporting process; and in a case where the detection is determined not to be the continuous detection, not execute the second reporting process.

13. A medical image processing method to be executed by a medical image processing apparatus comprising a processor, wherein the medical image processing method comprises:

executing an image acquisition process of acquiring a time-series medical image;

executing a region-of-interest detection process of detecting a region of interest from the acquired medical image;

executing a display control process of causing a display apparatus to display the medical image;

executing a first reporting process of, in response to the region of interest being detected in the region-of-interest detection process, causing the display apparatus to superimpose and display information about the detected region of interest on the medical image;

executing a feature quantity hold process of holding a feature quantity of the detected region of interest;

executing an identity determination process of determining an identity by comparing, of the feature quantity held in the feature quantity hold process, a feature quantity obtained at a time that is within a determined period before a first time, with a feature quantity of a first region of interest detected from a medical image captured at the first time;

determining, while the first reporting process is being executed, whether the detection is a continuous detection based on a result of the identity determination process;

in a case where the detection is determined to be the continuous detection, executing a second reporting process of, in response to the region of interest being detected in the region-of-interest detection process, outputting a sound from a sound output apparatus along with the first reporting process; and in a case where the detection is determined not to be the continuous detection, not executing the second reporting process.

14. A non-transitory computer-readable recording medium storing a program for causing, when read by a computer, the computer to execute the medical image processing method according to claim 13.

* * * * *